United States Patent
Goldfine et al.

(10) Patent No.: US 6,377,039 B1
(45) Date of Patent: Apr. 23, 2002

(54) METHOD FOR CHARACTERIZING COATING AND SUBSTRATES

(75) Inventors: Neil J. Goldfine, Newton; Kevin G. Rhoads, Andover; Karen E. Walrath; David C. Clark, both of Arlington, all of MA (US)

(73) Assignee: Jentek Sensors, Incorporated, Waltham, MA (US)

(*) Notice: Subject to any disclaimer, the term of this patent is extended or adjusted under 35 U.S.C. 154(b) by 0 days.

(21) Appl. No.: 09/191,668

(22) Filed: Nov. 13, 1998

Related U.S. Application Data

(60) Provisional application No. 60/065,545, filed on Nov. 14, 1997.

(51) Int. Cl.[7] .................. G01N 27/72; G01R 33/12; G01B 7/06; G01B 7/14
(52) U.S. Cl. .................. 324/232; 324/207.17; 324/227; 324/230; 324/233; 324/239
(58) Field of Search .................. 324/202, 207.17, 324/207.19, 207.26, 225, 227, 229–233, 239–243

(56) References Cited

U.S. PATENT DOCUMENTS

| | | | |
|---|---|---|---|
| 3,249,854 A | 5/1966 | Nevius | 340/870.32 |
| 3,721,859 A | 3/1973 | Blanyer | 361/236 |
| 3,939,404 A | 2/1976 | Tait | 324/224 |
| 4,058,766 A | 11/1977 | Vogel et al. | 324/667 |
| 4,355,300 A | 10/1982 | Weber | 340/146.3 |
| 4,399,100 A | 8/1983 | Zsolnay et al. | 422/62 |
| 4,423,371 A | 12/1983 | Senturia et al. | 324/663 |
| 4,496,697 A | 1/1985 | Zsolnay et al. | 526/60 |
| 4,757,259 A | 7/1988 | Charpentier | 324/227 |
| 4,799,010 A | 1/1989 | Muller | 324/240 |
| 4,810,966 A | 3/1989 | Schmall | 324/207.17 |
| 4,814,690 A | 3/1989 | Melcher et al. | 324/674 |
| 4,853,617 A | 8/1989 | Douglas et al. | 324/67 |
| 4,883,264 A | 11/1989 | Yoshikawa et al. | 271/110 |

(List continued on next page.)

FOREIGN PATENT DOCUMENTS

| | | |
|---|---|---|
| EP | 0 242 947 | 10/1987 |
| EP | 0 723 166 A1 | 7/1996 |
| GB | 2 031 155 A | 4/1980 |
| SU | 502205 | 4/1976 |
| SU | 578609 | 10/1977 |
| SU | 894547 | 12/1981 |
| SU | 1095101 A | 5/1984 |
| WO | WO 92/03090 | 3/1992 |

OTHER PUBLICATIONS

Goldfine, Neil et al., "Dielectrometers and magnetometers, suitable of in–situ inspection for ceramic and metallic coated components," SPIE Conference, Jun. 1995, 11 pages.

(List continued on next page.)

Primary Examiner—Jay Patidar
(74) Attorney, Agent, or Firm—Hamilton, Brook, Smith & Reynold, P.C.

(57) ABSTRACT

A system for characterizing coatings and substrates of a material under test. A sensor is positioned against a coated sample which is to be measured to obtain phase and magnitude measurements. Penetration depth of the magnetic waves of the sensor is a function of frequency. Measurements are made at each of a plurality of signal frequencies. The measured phase and magnitude data is applied with respect to a frequency independent parameter, such as conductivity, using a grid method. The conductivities of the coating and the substrate are determined by the limits of conductivity with respect to frequency. With the assumed conductivities of the coating and substrate, the sensor is once again placed over the material, and coating thickness and lift-off are determined. By examining the coating thickness versus frequency the accuracy of the measurement can be determined, since actual coating thickness does not vary with frequency in the material. Through iterative approximations, conductivity can then be accurately determined.

43 Claims, 19 Drawing Sheets

U.S. PATENT DOCUMENTS

| | | | |
|---|---|---|---|
| 4,912,414 A | 3/1990 | Lesky et al. | 324/329 |
| 4,922,201 A | 5/1990 | Vernon et al. | 324/236 |
| 5,015,951 A | 5/1991 | Melcher | 324/232 |
| 5,041,785 A | 8/1991 | Bogaerts et al. | 324/207.24 |
| 5,059,902 A | 10/1991 | Linder | 324/207.17 |
| 5,086,274 A | 2/1992 | Gobin et al. | 324/239 |
| 5,182,513 A | 1/1993 | Young et al. | 324/232 |
| 5,204,621 A | 4/1993 | Hermann et al. | 324/207.18 |
| 5,237,271 A | 8/1993 | Hedengren | 324/232 |
| 5,262,722 A | 11/1993 | Hedengren et al. | 324/242 |
| 5,278,498 A | 1/1994 | Vernon et al. | 324/234 |
| 5,293,119 A | 3/1994 | Podney | 324/242 |
| 5,315,234 A | 5/1994 | Sutton, Jr. et al. | 324/242 |
| 5,345,514 A | 9/1994 | Mahdavieh et al. | 382/8 |
| 5,363,051 A | 11/1994 | Jenstrom et al. | 324/661 |
| 5,371,461 A | 12/1994 | Hedengren | 324/225 |
| 5,371,462 A | 12/1994 | Hedengren et al. | 324/225 |
| 5,373,245 A | 12/1994 | Vranish | 324/662 |
| 5,389,876 A | 2/1995 | Hedengren et al. | 324/242 |
| 5,418,457 A | 5/1995 | Hedengren et al. | 324/225 |
| 5,434,504 A | 7/1995 | Hollis et al. | 324/207.17 |
| 5,442,347 A | 8/1995 | Vranish | 340/870.37 |
| 5,453,689 A | 9/1995 | Goldfine et al. | 324/239 |
| 5,463,201 A | 10/1995 | Hedengren et al. | 219/121.83 |
| 5,485,084 A | 1/1996 | Duncan et al. | 324/225 |
| 5,541,510 A | 7/1996 | Danielson | 324/233 |
| 5,629,621 A | 5/1997 | Goldfine et al. | 324/239 |
| 5,909,118 A * | 6/1999 | Logue | 324/232 |
| 5,994,897 A * | 11/1999 | King | 324/232 |

OTHER PUBLICATIONS

Goldfine, Neil et al., "A New Eddy–Current Based Technology for Repeatable Residual Stress and Age Degradation Monitoring," ASNT International Chemical and Petroleum Industry Inspection Technology IV, Houston, TX Jun. 19–22, 1995, 5 pages.

Krampfner, Yehuda D. and Johnson, Duane D., "Flexible Substrate Eddy Current Coil Arrays," Review of Progress in Quantitative Nondestructive Evaluation, vol. 7A, 1988. pp 471–478.

Zaretsky, M., et al., "Modal Approach to Obtaining Continuum Properties From Inter–Digital Electrode Dielectrometry," Massachusetts Institute of Technology, Lees Technical Report, Jul. 1986, pp 1–43.

Dodd, V.C. and Deeds, W.E., "Absolute Eddy–Current Measurement of Electrical Conductivity," From "Review of Progress in Quantitative Nondestructive Evaluation," vol. 1, 1982, pp. 387–394.

Dodd, C.V. and Simpson, W.A., "Measurement of Small Magnetic Permeability Changes by Eddy Current Techniques," presented at the National Fall Conference of the American Society for Nondestructive Testing, Oct. 19–22, 1970, pp. 217–221.

Rose, James H. and Nair, Satish M., "Exact recovery of the DC electrical conductivity of a layered solid," Inverse Problems, Letter to the Editor, 1991, pp. L31–L36.

Auld, B.A. et al., "Eddy–Current Signal Analysis and Inversion for Semielliptical Surface Cracks," Journal of Nondestructive Evaluation, vol. 7, No. 1/2, 1988, pp. 79–94.

Goldfine, Neil and Roach, Dennis, "Early Stage and Widespread Fatigue Damage Assessment for Aircraft Structures and Engines, Using a New Conformable Multiple–Frequency Eddy Current Sensor," ATA NDT Forum, Indianapolis, IN Sep. 8–11, 1997, pp. 1–13.

Goldfine, Dr. Neil, J., "Early Stage Fatigue Detection with Application to Widespread Fatigue Damage Assessment in Military and Commerical Aircraft," DOD/FAA/NASA Conference on Aging Aircraft, Ogden, UT, Jul. 8–10, 1997, pp. 1–10.

Goldfine. Neil J., "Magnetometers for Improved Materials Characterization in Aerospace Applications," Materials Evaluation, Mar. 1993, pp. 396–405.

Goldfine, Neil and Clark, David, "Near Surface Material Property Profiling for Determination of SCC Susceptibility," EPRI Balance–of–Plant Heat Excharnger NDE Symposium, Jackson Hole, WY, Jun. 10–12, 1996.

Morrison, Philip and Tsipis, Kosta, "New Hope in the Minefields," Massachusetts Institute of Technology's *Technology Review*, ISSN 0040–1692, vol. 100, No. 7, pp. 38–47.

"Innovations in Quantitative Nondestructive Evaluation," JENTEK Sensors, Inc. Brochure, No Date Given.

Goldfine, Neil et al., "Surface–Mounted Eddy–Current Sensors For On–Line Monitoring of Fatique Tests and For Aircraft Health Monitoring," Second Joint NASA/FAA/DoD Conference on Aging Aircraft, Aug. 1998, pp. 1–16.

Goldfine, Neil, "Uncalibrated, Absolute Property Estimation and Measurement Optimization for Conducting and Magnetic Media Using Imposed $\omega$k Magnetometry," Doctoral Thesis, Cataloged into the Massachusetts Institute of Technology Libraries on Oct. 6, 1992, pp. 1–139.

Miyakawa, Tasuo and Honjo, Ken, "Development of Instrument Detecting Nonmetal Foreign Bodies in Food Material," IEEE Transactions on Instrumentation and Measurement, Apr. 1994, pp. 359–362.

* cited by examiner

Lift-off variation with frequency for different coating conductivity for 10 mil coating.

Lift-off variation with frequency for different coating conductivity for 8 mil coating.

Lift-off variation with frequency for different coating conductivity for 6 mil coating.

METHOD FOR CHARACTERIZING COATING AND SUBSTRATES

RELATED APPLICATION

This application claims the benefit of provisional application No. 60/065,545, filed Nov. 14, 1997, the entire teachings of which are incorporated herein by reference.

GOVERNMENT SUPPORT

The invention was supported, in whole or in part, by a grant contract number NAS5-33212 from the National Aeronautics and Space Administration. The Government has certain rights in the invention.

BACKGROUND OF THE INVENTION

The technical field of this invention is magnetometry and, in particular, the nondestructive electromagnetic interrogation of materials of interest to deduce their physical properties and to measure kinematic properties such as proximity. The disclosed invention applies to both conducting and magnetic media.

Conventional application of magnetometers, specifically eddy current sensors, involves the excitation of a conducting winding, the primary, with an electric current source of prescribed temporal frequency. The produces a time-varying magnetic field at the same frequency. The primary winding is located in close proximity to the material under test (MUT), but not in direct contact with the MUT. This type of nondestructive electromagnetic interrogation is sometimes called near field measurement. The excitation fields and the relevant spatial and temporal variations of those fields are quasistatic. The magnitude and phase (or the real and imaginary parts) of the impedance measured at the terminals of the primary winding (i.e., the measured voltage at the primary winding terminals divided by the imposed current) or the transimpedance (i.e., the voltage measured at a secondary winding terminal divided by the imposed current in the primary winding) is used to estimate the MUT properties of interest.

The time-varying magnetic field produced by the primary winding induces currents in the MUT that produce their own magnetic fields. These induced fields have a magnetic flux in the opposite direction to the fields produced by the primary. The net result is that conducting MUTs tend to exclude the magnetic flux produced by the primary windings. The measured impedance and transimpedance at the terminals of the sensor windings are affected by the following: the proximity to the MUT; the physical properties (e.g., permeability and conductivity) of the MUT and the spatial distribution of those properties; the geometric construct of the MUT; other kinematic properties (e.g., velocity) of the MUT; and the existence of defects (e.g., cracks, corrosion, impurities).

The distribution of the currents induced within conducting MUTs and the associated distribution of the magnetic fields in the MUT, in the vicinity of the MUT, and within the conducting primary and secondary windings are governed by the basic laws of physics. Specifically, Ampere's and Faraday's laws combined with Ohm's law and the relevant boundary and continuity conditions result in a mathematical representation of magnetic diffusion in conducting media and the Laplacian decay of magnetic fields. Magnetic diffusion is a phenomena that relates the distribution of induced currents in conducting materials to the distribution of the imposed and induced magnetic fields. Laplacian decay describes the manner in which a magnetic field decays along a path directed away from the original field source.

Magnetometers, such as eddy current sensors, exploit the sensitivity of the impedance or transimpedance (measured at the sensor winding terminals) to the physical and geometric properties of the MUT. This is sometimes accomplished by using multiple temporal excitation frequencies. As the primary winding excitation frequency is increased, the currents in a conducting MUT exclude more and more flux until all the induced currents in the MUT are confined to a thin layer near the surface of the MUT. At frequencies for which the induced currents are all at the surface of the MUT, the MUT can be represented theoretically as a perfect conductor. In other words, at high enough frequency, variations in the conductivity of the MUT will no longer affect the impedance or transimpedance measured at the sensor windings.

This effect has been used in proximity measurement relative to a conducting media. Measurement of proximity to a metal surface is possible at a single excitation frequency, if that frequency is high enough that the MUT can be treated as a perfect conductor. For proximity measurement at lower frequencies, it is necessary to account for the effects of the conductivity of the MUT on the measured impedance, either by physical modeling or by calibration.

In an applications requiring the measurement of conductivity, it is necessary to operate at frequencies low enough that the measurements at the terminals of the conducting windings are sensitive to the MUT conductivity. Such applications include the monitoring of aging in conducting media, as well as the direct measurement of conductivity for quality monitoring in metal processing and manufacturing process control. For example, the accurate measurement of the case depth (e.g., the thickness of a heat-affected zone at the surface of a metal after heat treatment) requires a sensor winding geometry and excitation conditions (e.g., frequency, proximity to the MUT) that produce the required sensitivity to the conductivity and thickness of the heat-affected zone.

Two methods are available for determining the desired conditions: (1) experimentation and calibration, and (2) physical modeling and response prediction from basic principals. In practice, each of these techniques has met with some success. The principal limitations of experimentation and calibration are the need for fabrication of expensive calibration test pieces (standards) for each new application, the relatively small dynamic range (i.e., the small range of permissible MUT property variations over which the measurement specifications can be met), and the inaccuracies produced by variation in uncontrolled conditions such as temperature and lift-off errors.

The principal limitations of the physical modeling approach are the inaccuracies introduced by modeling approximations and the existence of unmodeled effects. These limitations are most severe for sensor winding constructs that are not specifically designed to minimize modeled effects.

In spite of these limitations, the successful use of conducting windings driven by a current source, as in eddy current sensors, to measure physical and kinematic properties has been widely demonstrated.

For example, eddy current sensors have been used to measure the thickness of conducting strips of known conductivity, as disclosed in Soviet Patents 578,609 and 502,205. Eddy current sensors have also been used for flaw detection, as disclosed in U.S. Pat. No. 3,939,404. Other eddy current sensor applications include measurement of the conductivity-thickness product for thin conducting layers, measurement of the conductivity of conducting plates using calibration standards, and measurement of proximity to conducting layers. Such sensors are also used in proximity measurement for control of machines and devices.

The ability to resolve distributions of parameters and properties of different layers in multi-layered materials has been addressed in U.S. Pat. No. 5,015,951. The referenced patent introduced the concept of multiple wavenumber magnetic interrogations of the material of interest, by imposing several different spatial magnetic field excitations, using multiple preselected sensor winding constructs, each with a different wavelength.

SUMMARY OF THE INVENTION

The present invention relates to a novel method and system for characterizing coatings and substrates. It is particularly applicable to measurements obtained using meandering winding magnetometers (MWM). However, it can be applied to measurements obtained with other detectors such as conventional eddy current detectors, so long as the detectors can be appropriately modeled. That is the response of the sensor can be predicted over the range in property values, and combinations of property values, to be tested. Alternatively, one could develop an extensive calibration or training to empirically determine the response, but the model approach is more desirable.

A difficulty arises when attempting to measure coating thickness on an underlying substrate, particularly where the conductivities of the coating and substrate are not known precisely. The present method provides for accurate measurement of those conductivities and of the coating thickness using an MWM or other modeled detector.

A sensor is positioned against a coated sample which is to be measured to obtain phase and magnitude measurements. Penetration depth of the magnetic waves of the sensor is a function of frequency. Measurements are made at each of a plurality of signal frequencies. The measured phase and magnitude data is applied with respect to a frequency independent parameters, such as coat thickness or conductivity in certain material, using a grid method. The conductivity of the coating and the substrate is determined by the limits of conductivity with respect to frequency. With the assumed conductivity of the coating and substrate, the sensor is once again placed over the material, and coating thickness and lift-off is determined. By examining the coating thickness versus frequency the accuracy of the measurement can be determined, since coating thickness does not vary with frequency in the material.

In one preferred embodiment, the surface roughness, which effects lift-off, is tailored into the method of determining the unknown properties. In another preferred embodiment, certain of the unknown properties, such as the conductivity of the substrate, are determined prior to proceeding with the method.

Modeling of MWM detectors is described in U.S. patent application Ser. No. 07/803,504 entitled, "Magnetometer Having Periodic Winding Structure and Material Property Estimator" filed on Dec. 6, 1991 by Goldfine and Melcher which issued on Sept. 26, 1995 as U.S. Pat. No. 5,453,689, the entire contents of which are incorporated herein by reference. In particular, the MWM can be modeled such that phase and magnitude outputs can be plotted against a conductivity lift-off grid such that the phase and magnitude provide both the conductivity of the underlying material and the lift-off of the MWM from the material.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
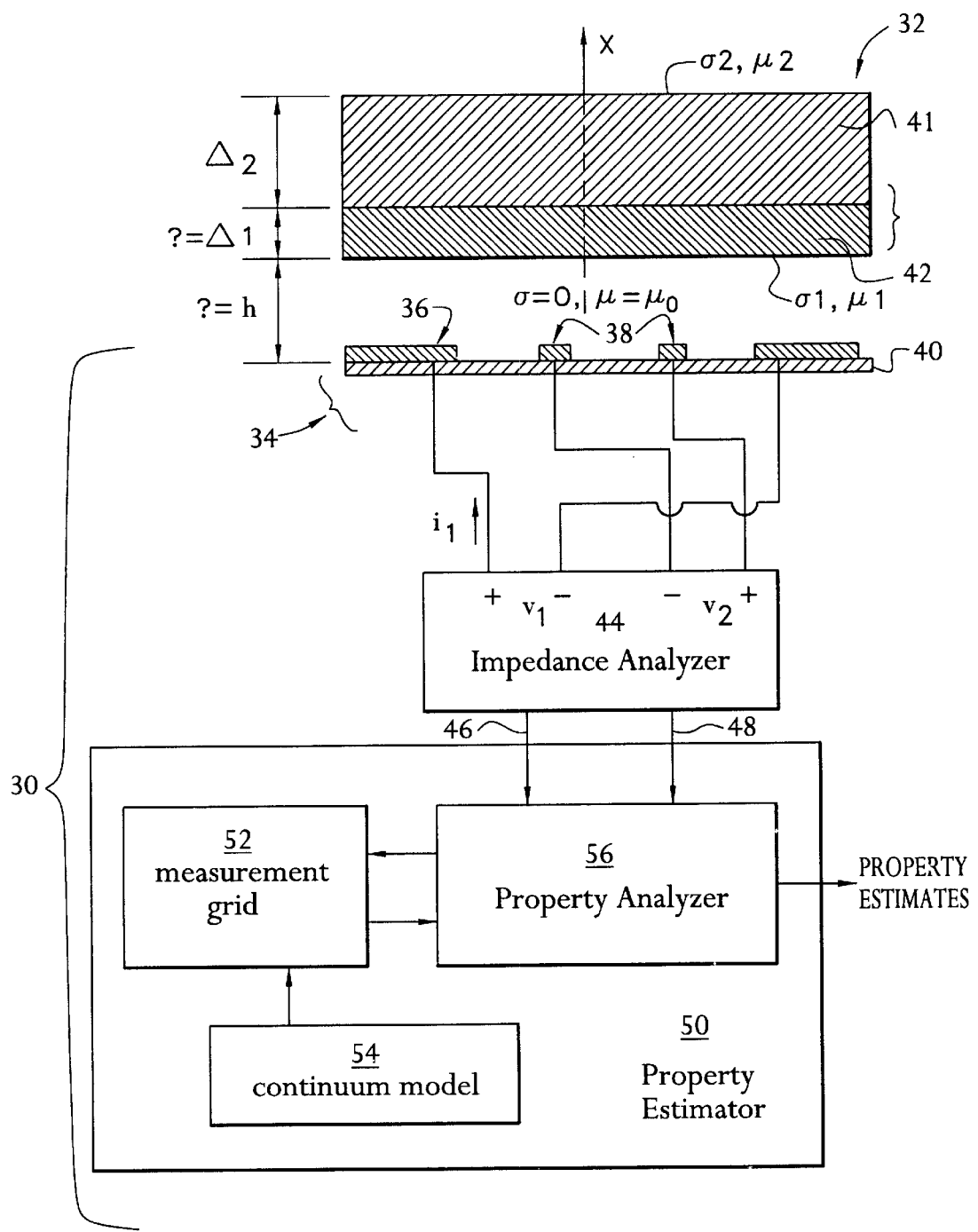
FIG. 1 is a schematic of an instrument and a material under test having a coating. Various components of the instrument are shown schematically.

FIG. 1 shows a schematic of an instrument or apparatus 30 for conducting non-destructive testing of a material under test (MUT) 32. The instrument 30 includes a sensor or an electromagnetic element 34 comprised of a primary winding 36, a sensing or secondary element 38, and an insulating substrate 40. In a preferred embodiment, the sensor has a foam backing to provide conformability to curved or flat parts, and is formed into a sensor tip, such as in FIG. 3B, that can be replaced easily if damaged.

FIG. 1 illustrates the application of the invention. In this invention, the MUT 32 is a substrate 41 with a coating 42. The actual lift-off of the MWM from the coating is unknown. Similarly, the thickness of the coating and the conductivities of the coating and substrate are unknown.

The primary winding 36 (also called the drive winding) is driven by an input current or voltage source at a temporal excitation frequency, f, measured in cycles per second where $f=\omega/2\pi$ and $\omega$ is the angular frequency of the input electric signal, measured in radians per second.

The sensing or secondary element 38 comprised of a plurality of elements interposed between legs of the primary winding 36. The plurality of elements of the sensing element 38 can be connected in series or in various groups as explained in U.S. patent application Ser. No. 09/182,693 entitled, "Absolute Property Measurement With Air Calibration" filed Oct. 29, 1998. The voltage induced at the terminals of the series or the respective groups of the sensing element 38 divided by the current applied to the primary winding 36 is called the transimpedance (or transfer impedance). The sensing element can be connected in absolute or differential modes.

The transimpedance is measured by an impedance analyzer 44. The impedance analyzer 44 inputs the current into the primary winding 36. The magnitude 46 and phase 48 of the transimpedance are inputs to a property analyzer 56 of a property estimator 50 which uses a measurement grid 52 to estimate pre-selected properties of a single or multiple layered MUT 32. The measurement grid 52 can be generated either with a continuum model 54 or through experimental measurements on calibration test pieces. The model measurement grid(s), and the property analyzer 56 are part of a property estimator 50 that converts measurements at the sensor terminals for single or multiple operating points (e.g., multiple temporal excitation frequencies) to estimates of pre-selected MUT properties of interest.

The use of an electromagnetic element 34, the impedance analyzer 44, and the property estimator 50 including property analyzer 56, measurement grid(s) 52 and continuum model 54 is described in U.S. patent application Ser. No. 07/803,504, entitled, "Magnetometer Having Periodic Winding Structure and Material Property Estimator" filed on Dec. 6, 1991 by Goldfine and Melcher which issued on Sep. 26, 1995 as U.S. Pat. No. 5,453,689, the entire contents of which are incorporated herein by reference.

In a preferred embodiment, the impedance analyzer 44 is a Hewlett-Packard HP4285, JENTEK Sensor Instrument Board, or similar. The property estimator 50 is a machine, such as a computer, using a program to perform the analysis and control the impedance analyzer 44. The program can be stored in many machine readable forms such as CD-Rom, floppy disk, hard-drive, recordable chips, etc.

Figure 2:
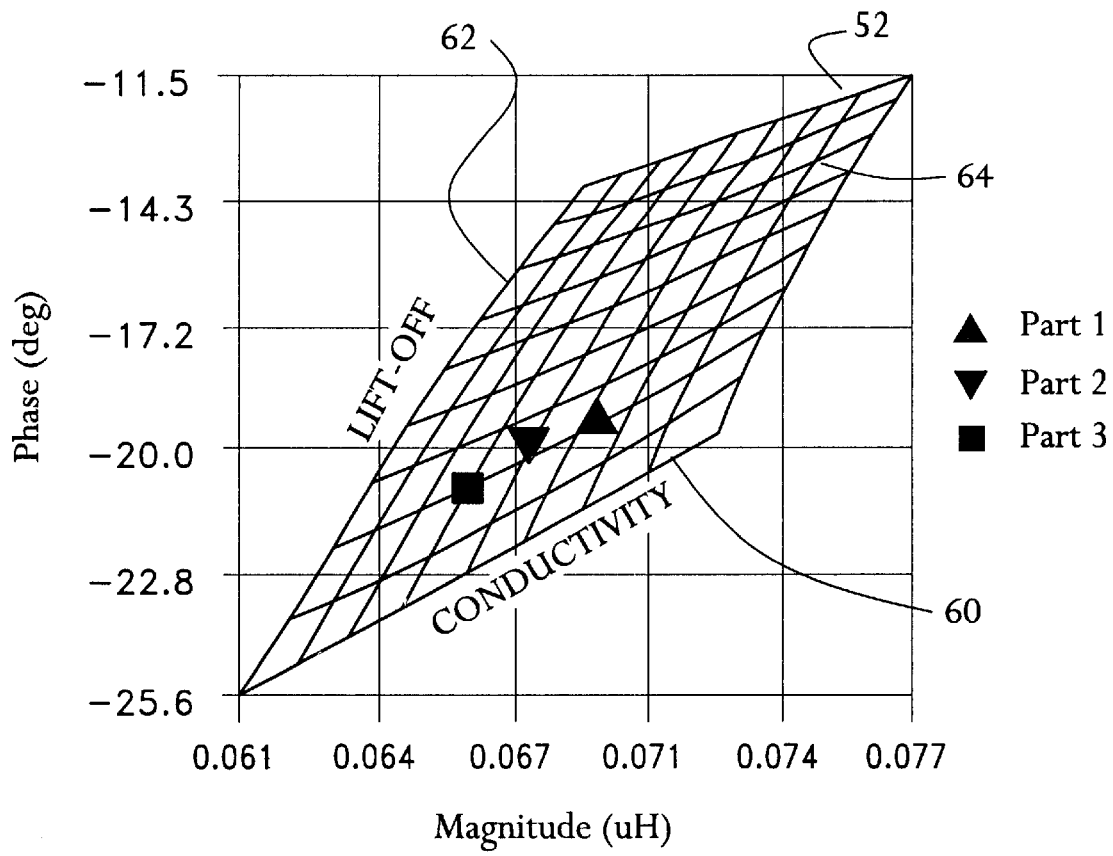
FIG. 2 shows a measurement grid resulting from use of the instrumentation.

FIG. 2 shows a two-dimensional measurement grid, such as described as reference numeral 52 in FIG. 1, with unknown properties (1) electrical conductivity 60 and (2) lift-off 62. A grid point 64 is located at the intersection of each pair of grid lines. Three sets of "measurement data points" taken from sensor impedance magnitude and phase are also represented by the sets of squares and two sets of triangles. This chart shows actual data in which each set contains five measurements that are coincident in the figure because of high measurement repeatability.

Grid tables can be of one, two, three or more dimensions. For example, grid tables of one dimension can include estimates of electrical conductivity varying by frequency, or a dependent property such as porosity varying by frequency. Two-dimensional grids can include, but are not limited to, estimates of (1) electrical conductivity and lift-off (defined to be the distance between the sensor and the material under test); (2) electrical conductivity and layer (or coating) thickness; (3) layer thickness and lift-off; (4) magnetic susceptibility and electrical conductivity; or (5) the real part of the magnetic susceptibility and the imaginary part of the magnetic susceptibility. Two examples of three-dimensional grids are (1) electrical conductivity, lift-off, and layer thickness and (2) electrical conductivity, magnetic susceptibility, and lift-off. These three-dimensional grids require that multiple measurements be made at different lift-offs, with multiple sensor geometry configurations, or that a series of two-dimensional grids such as those listed above, be calculated for different operating frequencies, sensor geometries, or lift-offs.

However, prior to taking measurements the instrument 30, including sensor 34, must be calibrated. The calibration is required because of the variation in sensors, instrument (e.g., instrument drift), and cable (e.g., cable capacitance). In addition, the environmental conditions existing at the time of measurement may affect some of the electrical properties being measured. Environmental conditions, such as the temperature of the material being measured or a reference part used for calibration, may be monitored and recorded while making measurements.

Measurement grids, such as shown in FIG. 2, can be calibrated using measurements in air or on reference parts. In a reference part calibration, the objective is to vary at least one of the "unknown" properties during calibration to ensure that the measurement grid is correctly aligned. For example, in a conductivity/lift-off grid, the lift-off can be varied during calibration, using shims of known or unknown thickness. This will establish the correct orientation for the grid.

In a preferred embodiment, the instrument 30 including the sensor 34 is calibrated by an air-calibration method. The sensor 34 is moved away from the material under test and other objects. A current is introduced into the primary winding 36. The corresponding magnetic field induces a magnetic field in the material under test that results in a voltage on the sensing element 38 that is measured using the impedance analyzer 44. The phase and magnitude can then be compared to the measurement grid to determine offset and scale factors that anchor the data onto the grid. The phase and magnitude is compared to the measurement grid. For air calibration, only the infinite lift-off point is needed to estimate the variations in the cable, sensors, and instrument parameters. This eliminates errors caused by operators and poor calibration standards.

Also, offsets, scale factors, or parasitic impedance due to instrument drift or uncalibrated behavior can be computed and used later to shift the measurement data. In addition, the conductivity might be varied during calibration or as part of a measurement procedure to establish the orientation of a line of constant lift-off. By varying the part temperature, the conductivity will vary with the lift-off remaining constant. For other grid types, such as a conductivity permeability grid, the permeability might be varied during calibration by applying a bias magnetic field. This would permit alignment of the lines of constant conductivity (along which only the permeability will vary). During measurement procedures it is also desirable to make multiple measurements at multiple operating conditions including multiple lift-offs, temperatures, or bias fields, to permit averaging of unknown property estimates, as well as to permit estimation of more than one unknown property.

Calibration is further discussed in U.S. patent application Ser. No. 09/182,693 entitled, "Absolute Property Measurement With Air Calibration" filed Oct. 29, 1998 and in U.S. patent application Ser. No. 08/702,276 entitled, "Meandering Winding Test Circuit" filed Aug. 23, 1996 by Neil J. Goldfine, et al., which issued on Aug. 11, 1998 as U.S. patent application Ser. No. 5,793,206, the entire contents of which are included by reference.

Figure 3A:
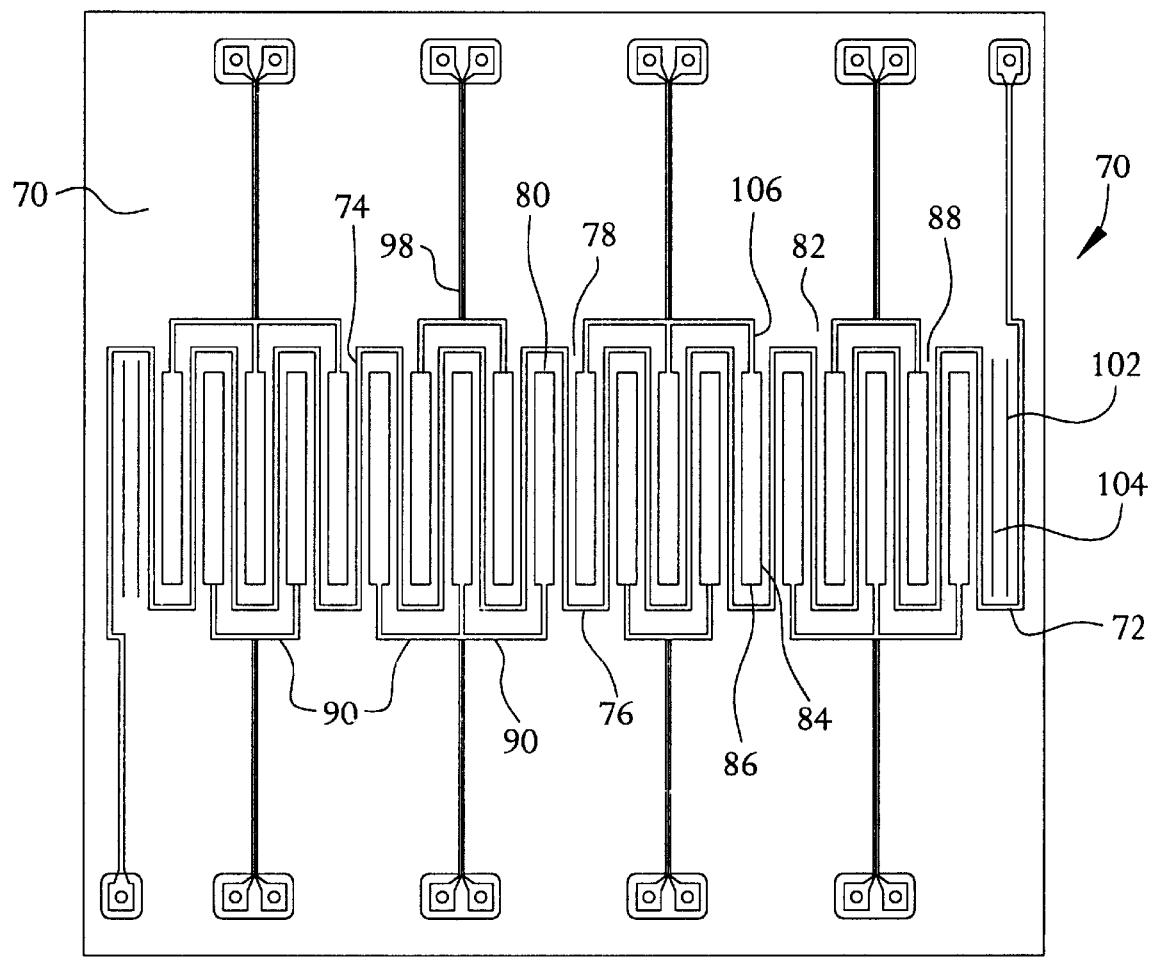
FIG. 3A is a front view of a sensor with a meandering primary winding and having a sensing elements grouped into groups of two or three individual sensing, secondary, elements which are not overlapped.
Figure 3B:
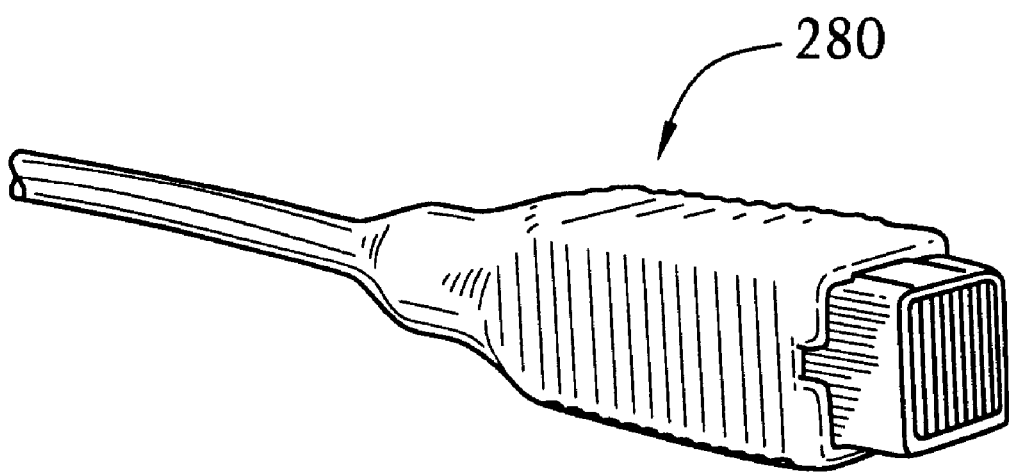
FIG. 3B illustrates an improved MWM probe design with a removable foam sensor tip.

FIG. 3A shows a sensor 70 having a meandering primary winding 72, also referred to as a meandering drive winding. The primary winding 72 is a square wave having a plurality of parallel legs or extending portion 74 which, in FIG. 3A, extend vertically. The primary winding 72 has connecting portions 76 which join the extending portions 74 to create the square wave shape.

The alternating of ends that the connection portion 76 extend between to adjacent extending portions 74 form alternating opened channels 78 which alternate opening on one side or the other. The sensor 70 has a plurality of sensing elements 80 located in these channels 78 between two parallel extending portions 74. Each sensing element in the one set 82 of channels, those that are opening to the top in FIG. 3A, has a pair of parallel legs 84 which are adjacent and spaced from the extending portion 74 of the primary winding. The parallel legs are joined by a connecting portion 86 at the closed end of the channel 78 and have a pair of ends 88 extending from the other end, the open end. The sensing elements 80 in the other set 94 of channels 78, those that open towards the bottom in FIG. 3A, are similarly configured with pair ends 88 extending from the bottom open end.

The sensor 70 has eight groupings 90 of secondary or sensing elements 80, containing either two or three individual secondary elements 80. By combining the signals from a two-element and three-element group on either side of the primary winding, an imaging pixel is created. The sensor 70 is a non-overlapping grouping array.

The meandering drive winding extends a half wavelength 100 at each end of the array, and a pair of dummy sensing elements 102 and 104 are formed within those final meander half wavelengths to maintain the periodicity of the field as viewed by the end sensing elements. The dummy windings 102 and 104 are not closed and not connected to form a loop so that the net current flowing through the windings is minimized. This simulates the high impedance of the secondary winding terminal connections that minimizes the current flow through the secondary windings. Connecting or shorting the dummy elements together so that they form a closed loop would lead to significant current flowing through the dummy elements which would also perturb the magnetic field distribution and reduce the effectiveness of the dummy elements in maintaining the periodicity of the field distribution. The dummy elements are introduced to expose the end secondary elements to the same magnetic field distribution as the interior secondary elements. The array could be similarly extended even further if required for accurate modeling. The purpose is to extend the periodicity of the field beyond the last connected sensing element to reduce the unmodeled "edge" effects at the end of the sensor.

The ends 88 of the sensing elements are set back from the connecting portions 76 of the meandering winding.

However, it has been found that a setback of at least one wavelength, as previously believed, is not required. A setback of one quarter to one half wavelength has been found sufficient to assure that the magnetic flux linked by the connecting elements is less than 10 percent of the total flux linked into the sensing elements. The greater the setback, the smaller the amount of linkage and the more the extended portions appear to be infinite to the sensing elements. Too much setback will reduce the total signal size which is determined by the area of the sensing element footprint.

At the ends of the sensing elements which connect to the respective leads 90 and 98, the etched leads are shouldered in, as at 106, to minimize the coupling of the leads 90 and 98 extending from the sensing elements 80 with the meandering primary or drive winding 72. The leads in the region of the primary winding 72 are exposed to stray, fringing magnetic fields. The fields at the edges of the main footprint of the sensor are not represented in the continuum model for the response of the sensor. The response to these stray fields must either be minimized, such as by reducing the gap between the secondary leads as discussed above or by compensated for the effects through an equivalent circuit or calibration as discussed below. Bringing element leads out close together or in twisted pairs is a standard method for eddy current sensors. The goal is to link fields only in the desired sensing regions within the footprint. The primary winding 72 has a pair of leads 108.

In this array the gap between the secondary leads and the primary windings is increased to reduce the coupling of higher order spatial modes of the magnetic flux into the secondary windings. The sensor 70 shown in FIG. 3A is enlarged for clarification.

Figure 4:
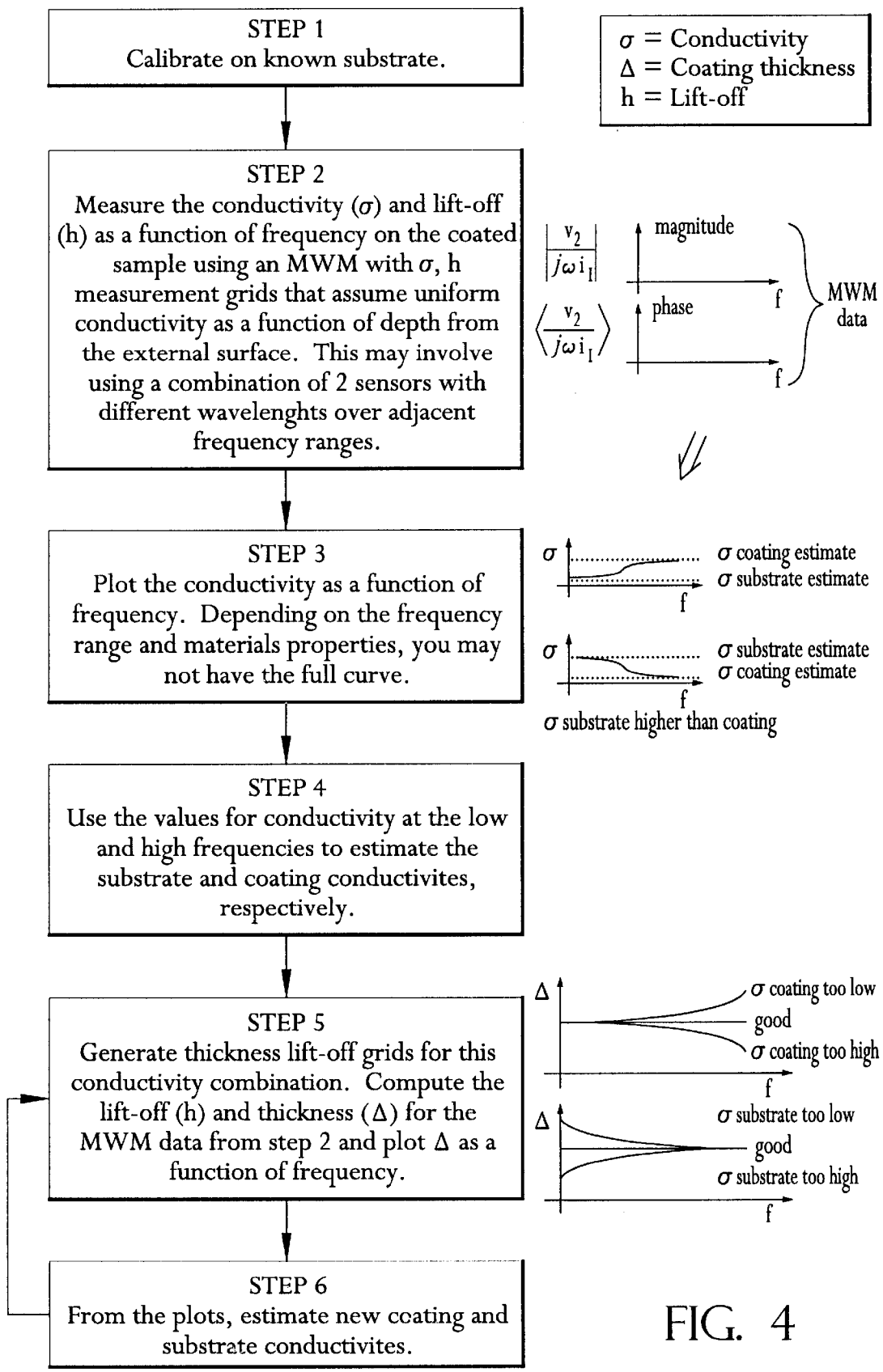
FIG. 4 is a flow chart of the method of determining the coating and substrate conductivity and thickness.

A flow chart of the method of the invention is seen in FIG. 4. In step one, the MWM is first calibrated using air calibration, discussed above, on a known modeled substrate. Preferably, the known substrate is a coating on an underlying substrate which approximates the coating and underlying substrate being detected. Alternatively, calibration can be on an uncoated substrate of known conductivity which has been modeled. Finally, for sensors which have insignificant unmodeled behavior, the sensor can be calibrated while exposed only to air. In each case, calibration is performed using a conductivity/lift-off grid which has been generated for the particular test substrate.

Calibration is further discussed in U.S. patent application Ser. No. 09/182,693 entitled, "Absolute Property Measurement With Air Calibration" filed Oct. 29, 1998; in U.S. patent application Ser. No. 08/702,276 entitled, "Meandering Winding Test Circuit" filed Aug. 23, 1996 by Neil J. Goldfine, et al., which issued on Aug. 11, 1998 as U.S. Pat. No. 5,793,206; and in U.S. patent application Ser. No. 07/803,504 entitled, "Magnetometer Having Periodic Winding Structure and Material Property Estimator" filed on Dec. 6, 1991 by Goldfine and Melcher which issued on Sep. 26, 1995 as U.S. Pat. No. 5,453,689, the entire contents of which are included by reference.

Calibration compensates for instrument drift, set-up errors, unmodeled sensor behavior, and probe and cable variations. Where calibration is against a solid substrate, it is preferred that measurements be made with the MWM positioned against the substrate and also with an insulating shim positioned between the MWM and the substrate. A nominal surface roughness can be assumed. "Absolute Property Measurement With Air Calibration" patent application discussed above and incorporated by reference discusses in further detail compensation for probe and sensor variations.

In step two, the calibrated sensor is positioned against the coated sample which is to be measured to obtain phase and magnitude measurements. The penetration depth of a MWM is a function of frequency, and measurements are made at each of the plural signal frequencies. For example, ten signal frequencies can be applied at frequencies ranging from one to 25 megahertz, with magnitude and phase measurements obtained at each signal frequency. Although a single MWM may be used for each frequency measurement, it may be desirable to use plural MWMs. For example, a short wave length MWM may be used in the high frequency range to focus on the coating, while a long wavelength MWM may be used in a low frequency range to focus on the substrate. Even with a single sensor, the high frequency signals respond principally to the surface characteristics; whereas, the low frequency signals penetrate deeper into the substrate.

Figure 5A:
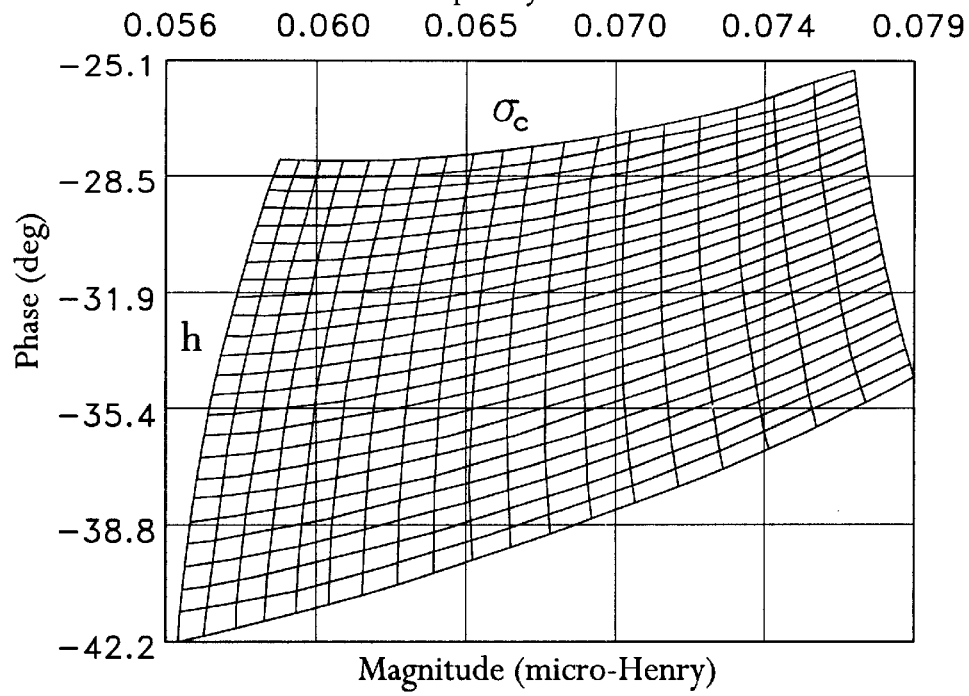
FIGS. 5A–5C show measurement grids showing lift-off and conductivity at various frequencies for a conductive coating on a magnetizable substrate.
Figure 5B:
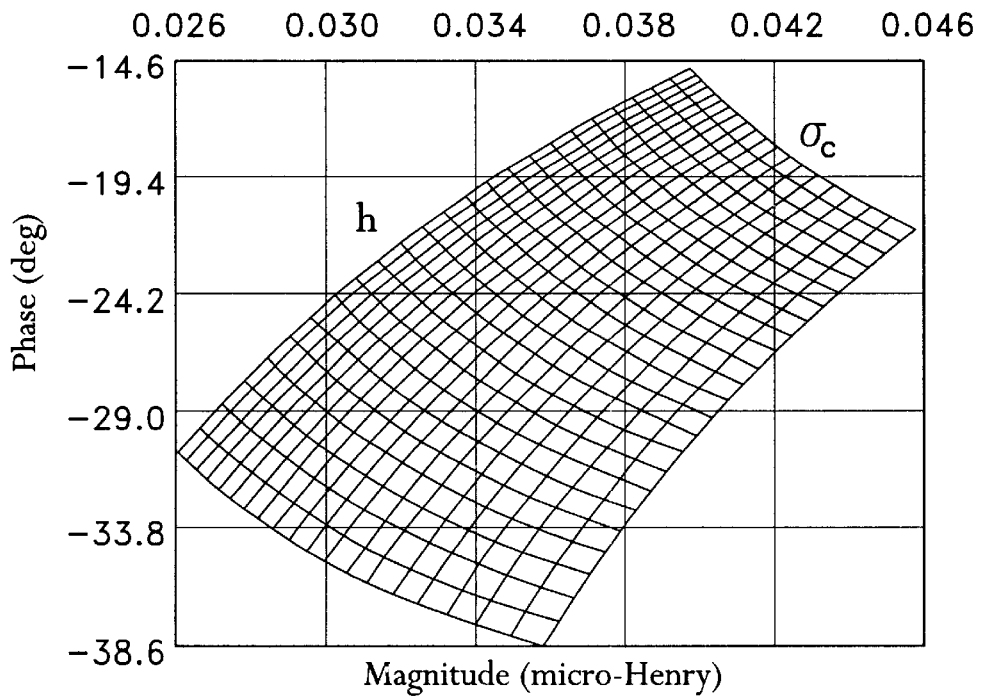
Figure 5C:
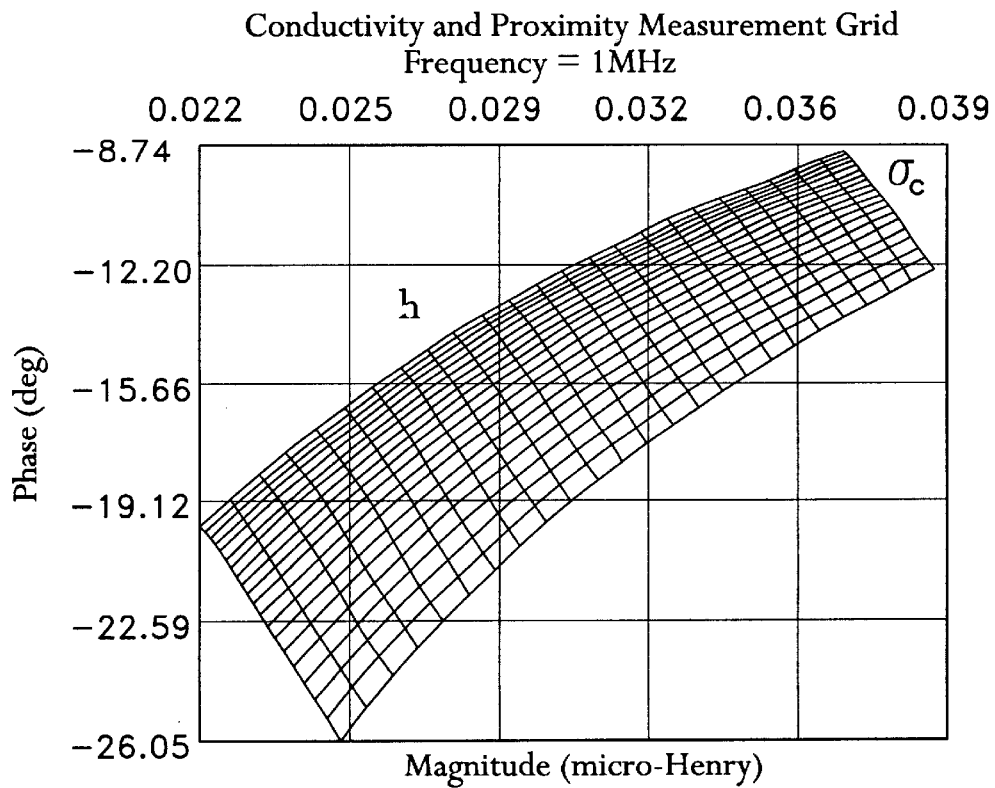
Figure 6A:
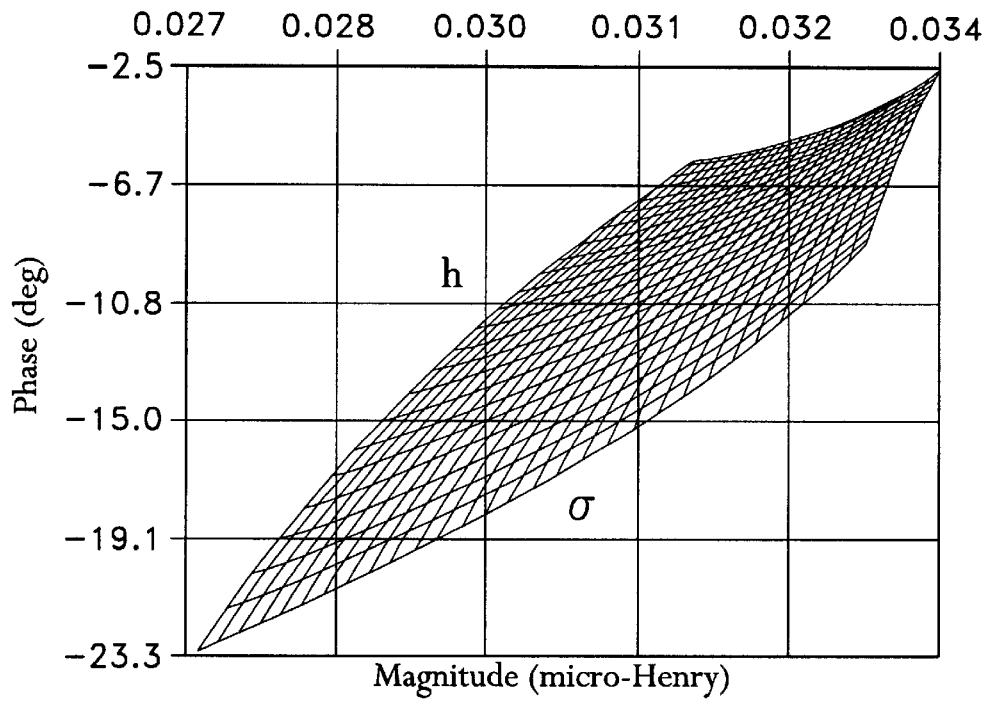
FIGS. 6A–6C show measurement grids showing lift-off and conductivity at various frequencies for a conductive coating on a non-magnetizable substrate.
Figure 6B:
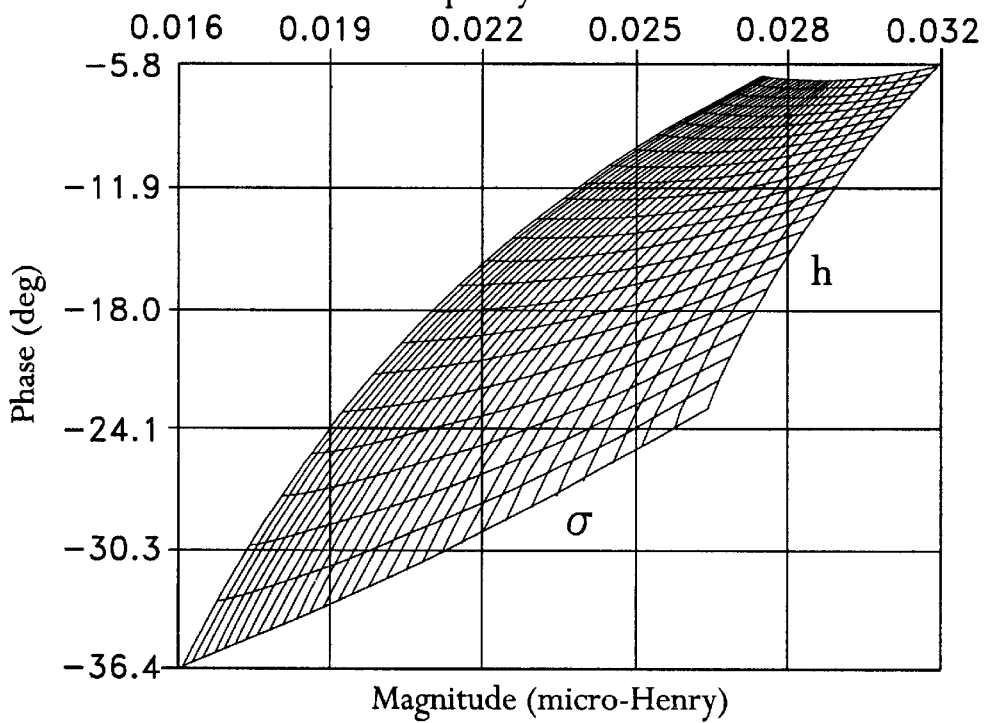
Figure 6C:
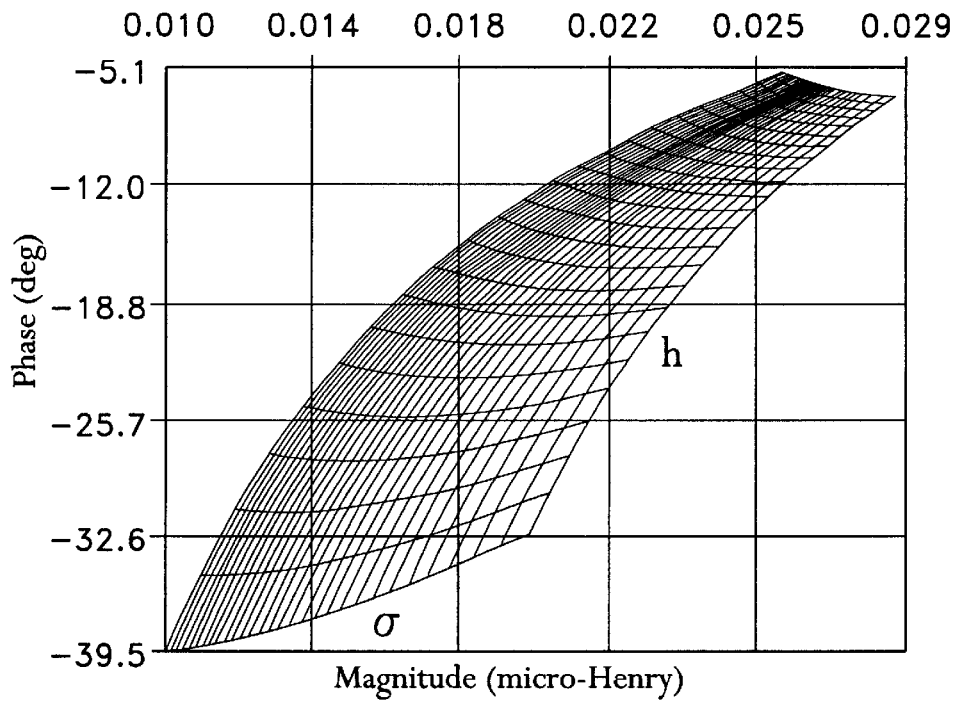

In step three, the data measured in step two is applied to respective frequency-specific conductivity, lift-off grids to obtain conductivity estimates at each frequency. FIGS. 5A–5C are measurement grids, similar to that of FIG. 2, for a conductive coating on a magnetizable substrate at FIGS. 6A–6C for a conductive coating on a nonmagnetizable substrate. Modeling of MWM response is frequency dependent, so a different conductivity, lift-off grid modeled for the respective frequency is used for each frequency measurement. For purposes of this measurement, it is assumed that the conductivity through the coating and surface is uniform. The result is a plot as illustrated to the right Of step three. In particular, if the conductivity of the coating is higher than that of the substrate, one will plot a conductivity measurement against frequency in which conductivity increases with frequency. On the other hand, if the conductivity of the substrate is higher than the coating, the measured conductivity will decrease with frequency.

In step four, one looks to the plot generated in step three to estimate the conductivities of the coating and underlying substrate. In particular, the substrate conductivity is assumed to be the conductivity approached by the plot at the low frequencies, and the coating conductivity is estimated to be the limit of the conductivity plotted at the high frequencies.

Figure 5D:
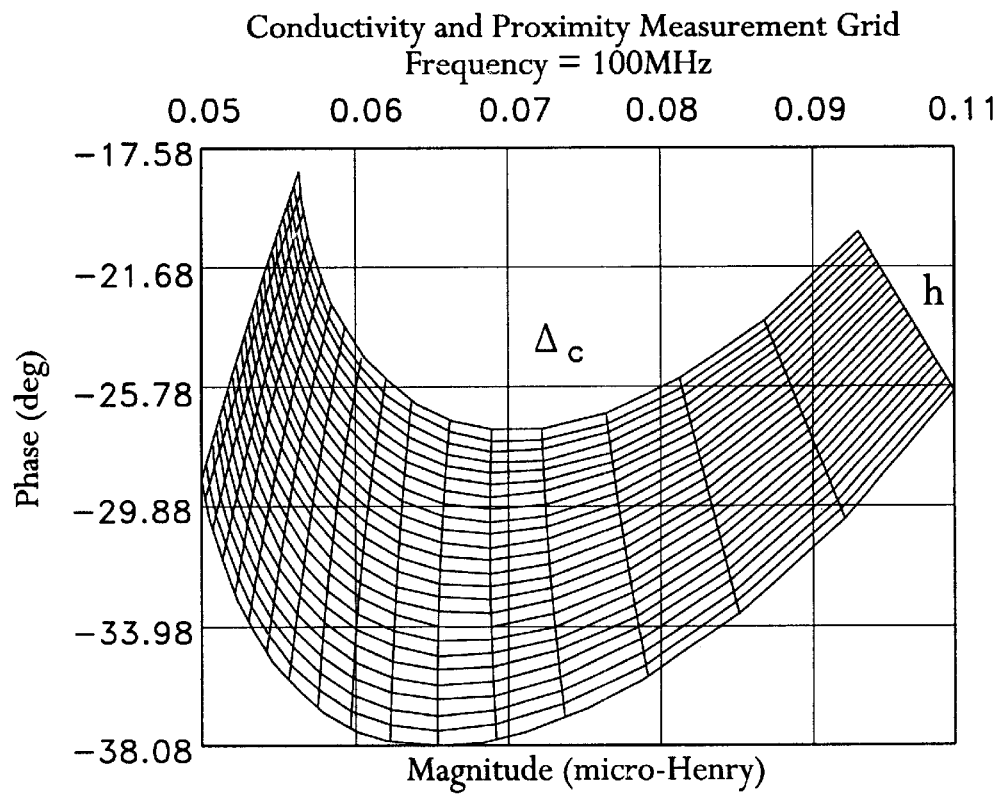
FIGS. 5D–5F show measurement grids for coating thicknesses and lift-off for a magnetizable substrate.
Figure 5E:
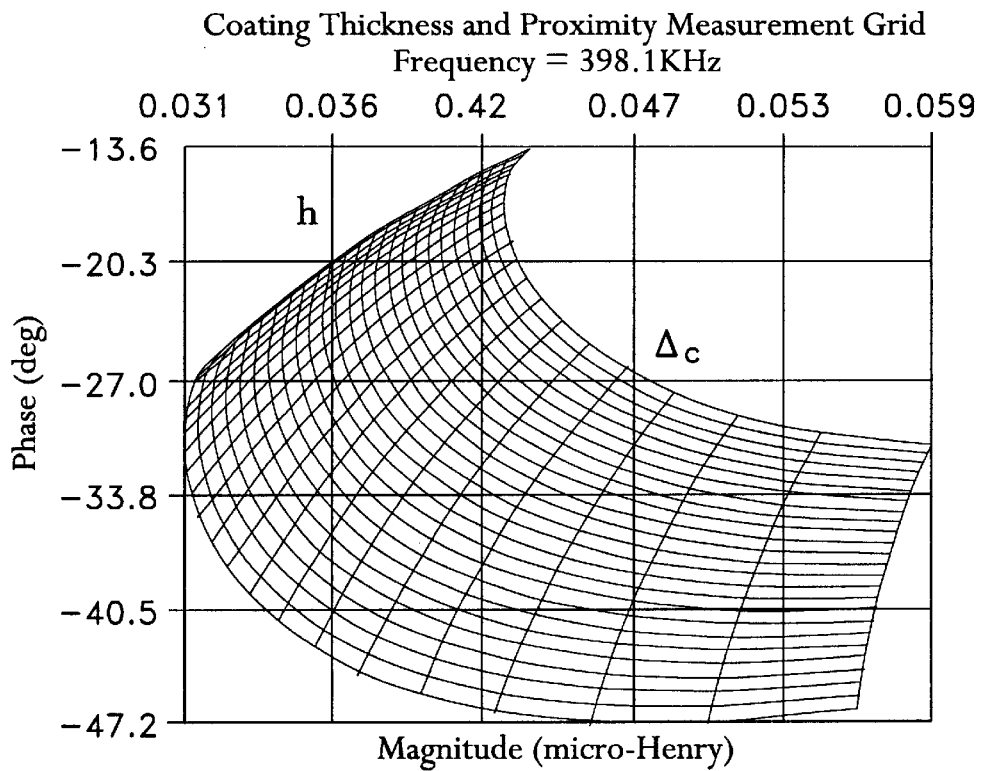
Figure 5F:
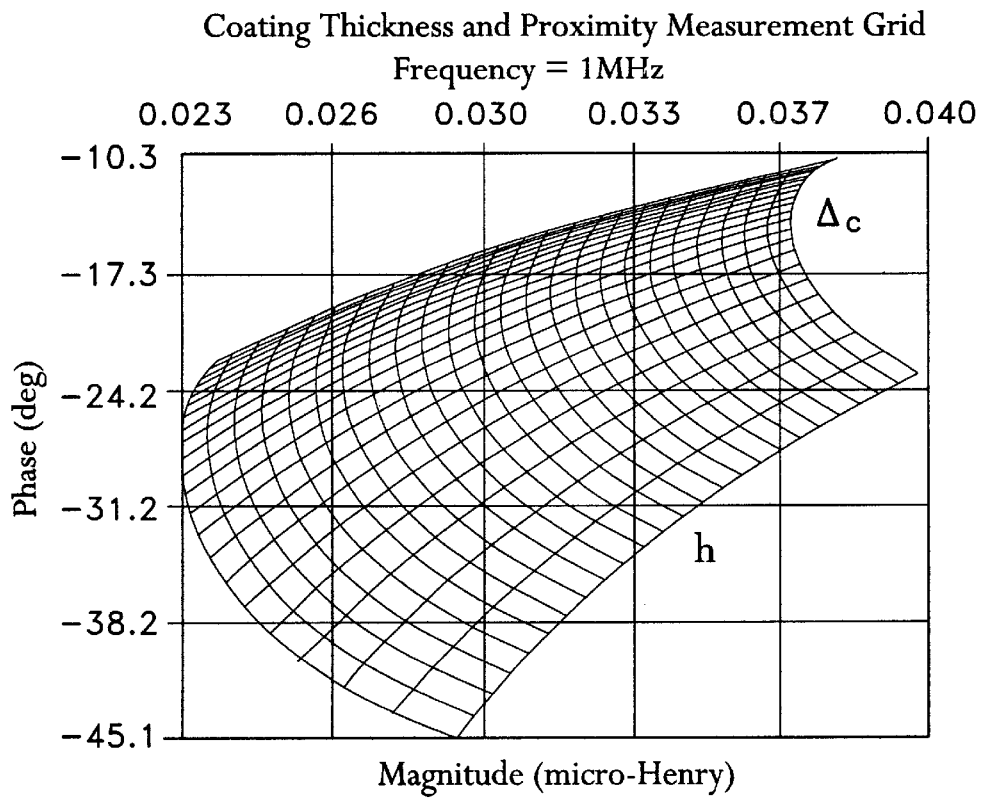
Figure 6D:
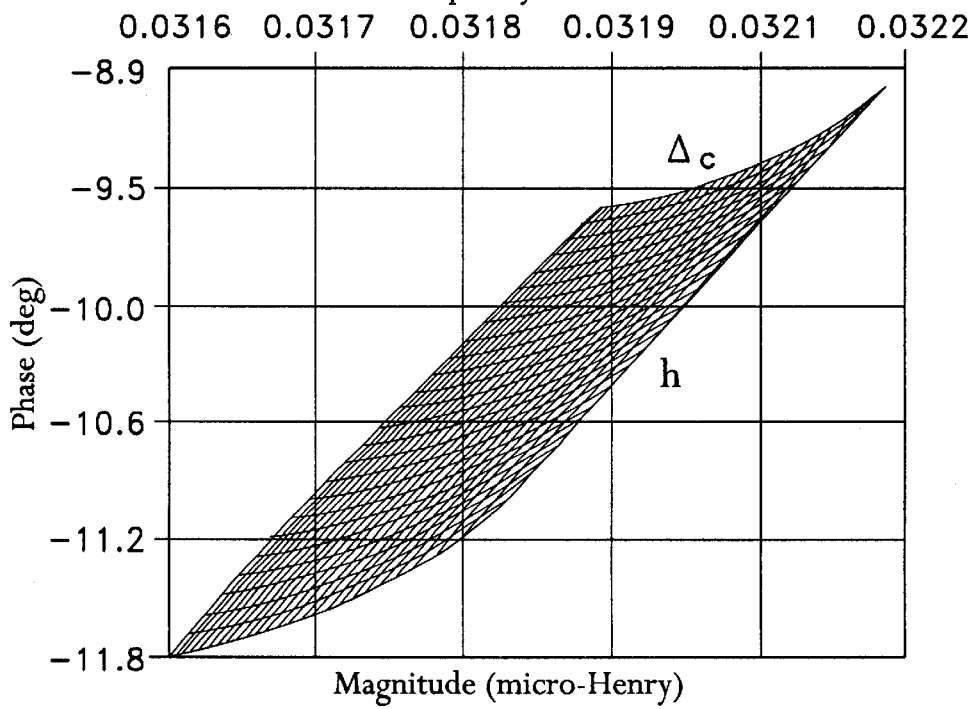
FIGS. 6D–6F show measurement grids for coating thickness and lift-off for a non-magnetizable substrate.
Figure 6E:
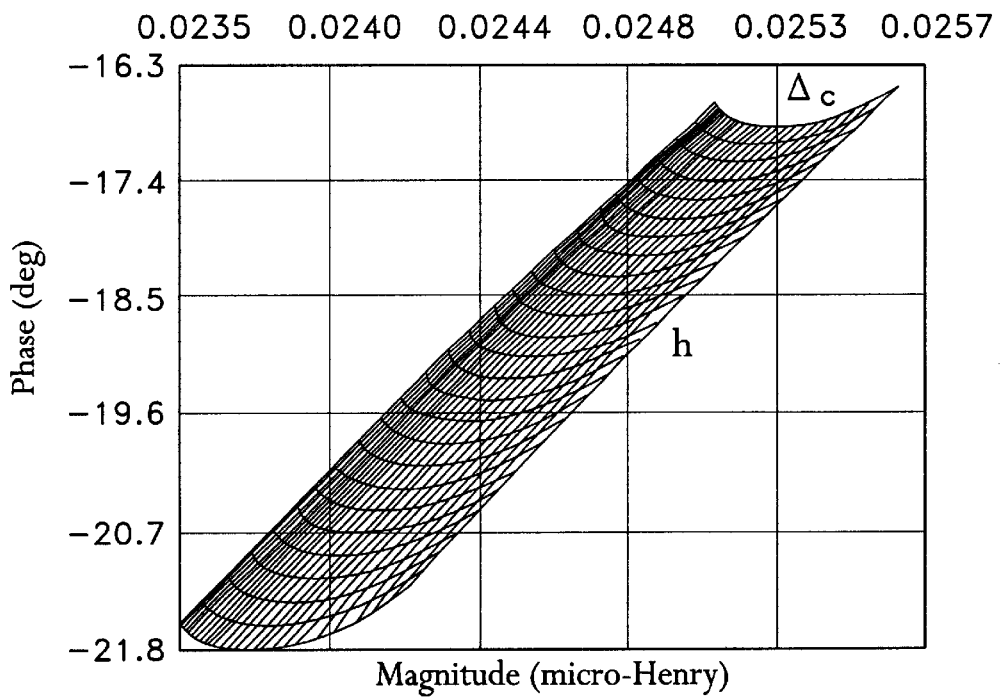
Figure 6F:
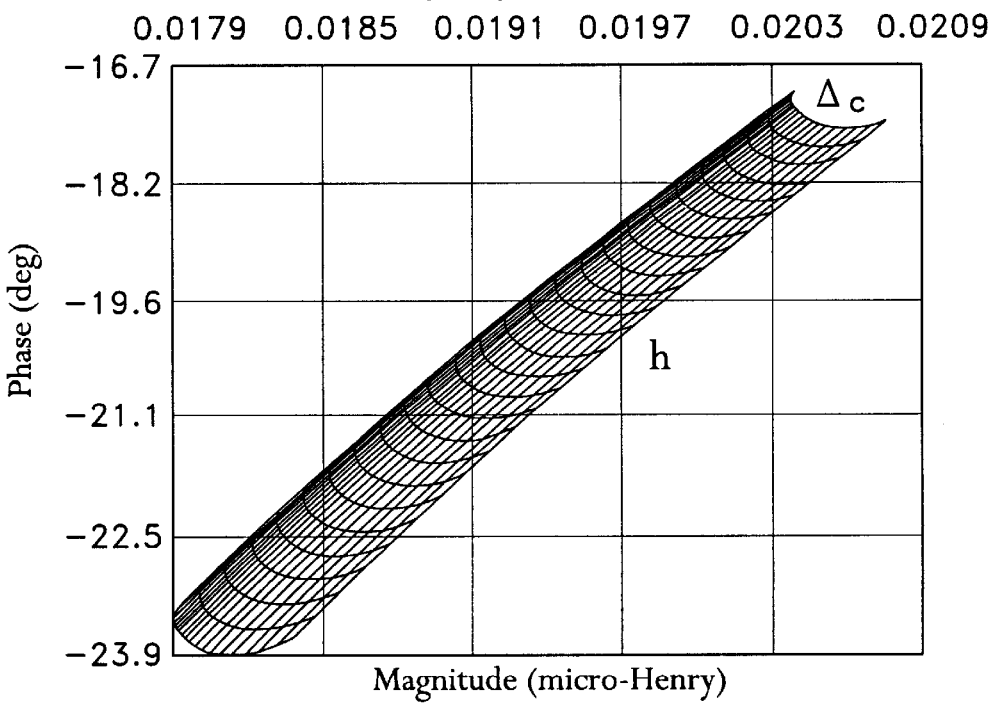

In step five, the system comprising the MWM positioned over a coating of assumed conductivity on a substrate of assumed conductivity can then be modeled to create a coating thickness, lift-off grid, as illustrated in FIGS. 5D–5F, for a magnetizable substrate and FIGS. 6D–6F for a non-magetizable substrate. Using the original data from step two, the thickness, lift-off grid can be used to determine the coating layer thickness A as a function of frequency. Since the coating thickness does not actually change with frequency, the plot should be a horizontal line if the assumed conductivities are accurate. However, if the assumed conductivities are not accurate one would expect a plot of layer thickness against frequency as illustrated to the right of step five. It has generally been found that the initial substrate conductivity estimate from step 4, is sufficiently accurate and that assumed coating conductivity can be modified to provide more accurate measurements.

In step six, the coating and substrate conductivities are re-estimated and those new estimates are used to again determine the thickness of the layer in step five. Once a level plot is obtained in step five, accurate estimates of coating and substrate conductivities and an accurate measurement of coating thickness have been obtained.

In step five, lift-off can be plotted against frequency instead of or in addition to plotting thickness.

The technique described here can be used to determine quality of bonds of coatings on substrates by looking at the conductivity or thickness as a function of frequency and noting any aberrant behavior in those plots. Further, the system can be modeled for three layers to include an interdiffusion zone between the coating and the substrate.

Since lift-off can be the result of surface roughness and/or an intermediate layer such as a non-conductive shim, it is desired to model surface roughness in certain instances when using this method. See Goldfine and Clark, "Materials Characterization Using Model-Based Meandering Winding Eddy Current Testing (MW-ET), Aug. 21–23, 1995, which is incorporated by reference in its entirety.

In one preferred embodiment, the $R_A$, surface roughness, is related to the lift-off. The $R_A$ value is defined as the average deviation from the mean or centerline of the surface. The CLA value refers to this centerline average while the RMS value is $(R_A)^{0.5}$. The $R_A$ integral is defined as $$R_A = \frac{1}{l}\int_0^l |y|\,dl$$

where y is the height of roughness from the centerline and l is called the cutoff length. The $R_A$ value is only meaningful if the cutoff length is large compared to the surface features.

Figure 7:
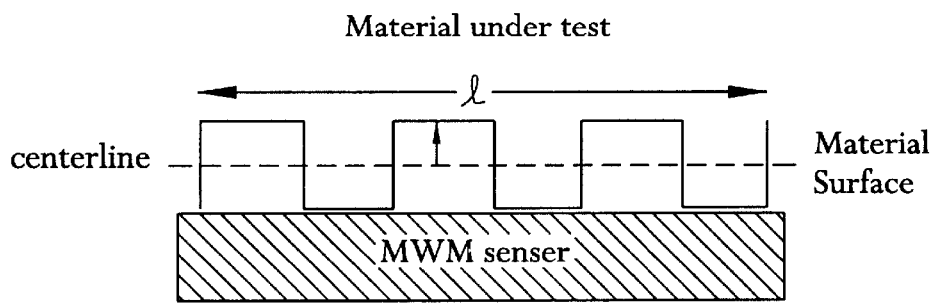
FIG. 7 is a schematic of a sensor over a coated material characterized by a square wave shape of texture.

Referring to FIG. 7, the $R_A$ values are calculated using an assumption of a square wave, sinusoidal, and triangular surface geometries. The $R_A$ values for a surface roughness that can be modeled as a periodic square wave with amplitude a (2a peak to peak) is calculated as follows;

$$R_A = \frac{1}{l}\int_0^l a\,dx = a$$

Similarly, a periodic sinusoidal surface geometry has an $R_A$ value of $(2a/\pi)$ and a triangular geometry has an $R_A$ value of $(a/2)$. In all cases, the $R_A$ value is the peak height multiplied by a factor corresponding to the surface geometry.

In one example, a ceramic coating is used to provide thermal protection for a turbine blade. This thermal barrier coating (TBC) is electrically insulating and its thickness is measured by the MWM as an effective change in lift-off. Note that microcrack of the ceramic may also relieve stress and produce increase MWM lift-off measurement. This also provides a prediction of TBC failure. Lift-offs (TBC coating thicknesses) as high as 12 mils are accommodated in the test.

In one set of experiments, a set of aged thermal barrier coating (TBC), where the TBC was over a bond coat, was measured using the MWM. The goal of the test is measuring the effective increase in the distance from the MWM winding plane to the first metallic coating layer surface. This layer location was expected to move away from the sensor winding plane with thermal exposure because an oxide layer formed between the bondcoat and the ceramic making the ceramic layer appear thicker to the MWM. The multiple frequency MWM method described above measures the bondcoat thickness and the electrical conductivity of the bondcoat. The combination of these measurements is used to access the state of degradation of the TBC coating system.

Figure 16:
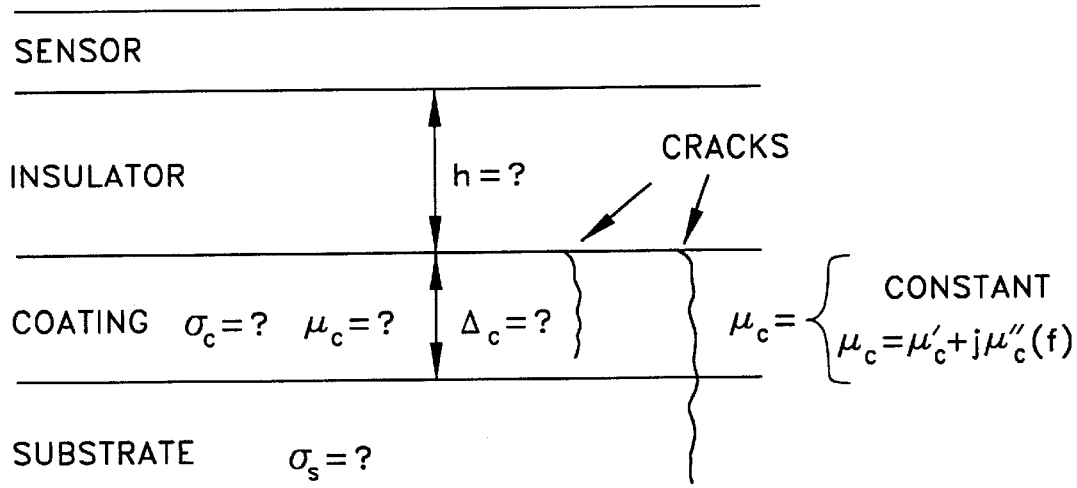
FIG. 16 is an illustration of a layered material containing cracks in the coating and cracks through the coating into the substrate.
Figure 17:
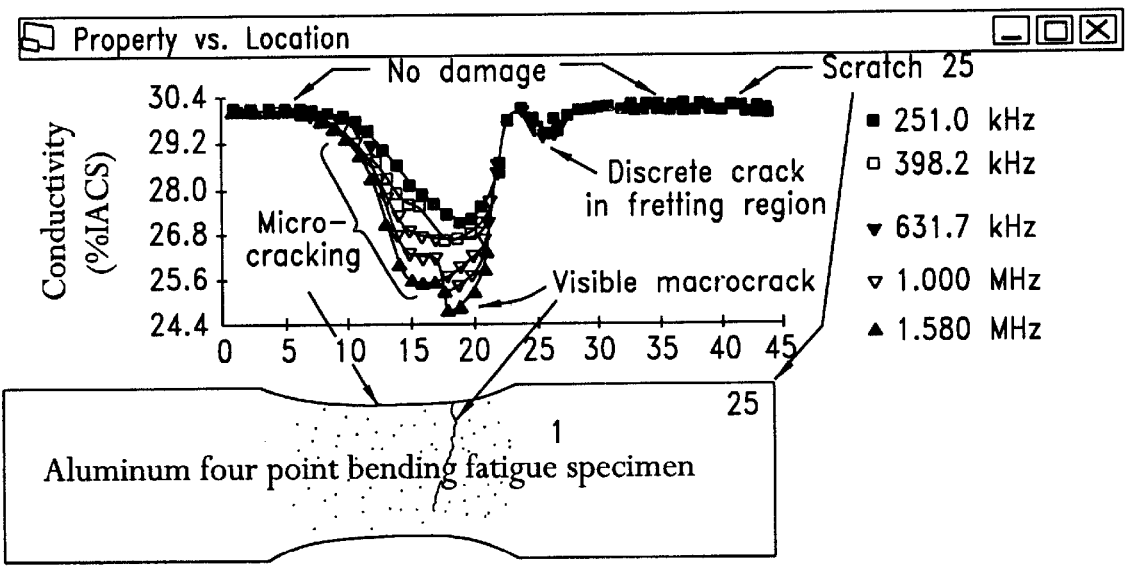
FIG. 17 shows a multiple frequency conductivity scan across a four-point bending fatigue specimen.

In another example, degradation or flaw formation in conducting coatings on conducting substrates can also be determined using these multiple frequency techniques. In turbine blade applications, thermal aging of the bond coat can lead to an increase in the effective complex magnetic permeability of the coating, and mechanical stresses can lead to the formation of cracks in the coating or both the coating and the substrate. This is illustrated in FIG. 16. The potential properties to be measured include the proximity of the sensor to the material under test h, the coating conductivity $\sigma_c$, thickness $\Delta_c$, permeability $\mu_c$, and substrate conductivity $\sigma_s$. The cracks lead to frequency dependent reductions in the electrical conductivity, as illustrated in FIG. 17 for an aluminum four-point bending fatigue specimen. The electrical conductivities are constant with frequency in areas without damage. Areas with the greatest damage and visible cracks have the largest reduction in electrical conductivity with frequency. In another abstract representation, a coating can be represented as a bulk ohmic conductivity that is constant with frequency and a crack in the coating might be represented as a complex frequency dependency permeability $\mu=+j\mu(f)$. Multiple wavelengths of the MWM can then be used to vary the depth of penetration of the magnetic field at a given frequency so that depth information about the frequency dependent property is obtained. The ability to measure the coating and substrate properties independently provides the capability to determine whether the cracks penetrate through the coating into the substrate. For an uncoated material, a near surface region containing one or more cracks can be represented by a layer of reduced conductivity so that the multiple frequency approach provides information about the depth of the crack.

The detection of cracks is further discussed in U.S. Ser. No. 09/039,190, entitled, "Magnetometer Detection of Fatigue Damage in Aircraft" filed Mar. 13, 1998, the entire contents of which are incorporated herein by reference.

Figure 8:
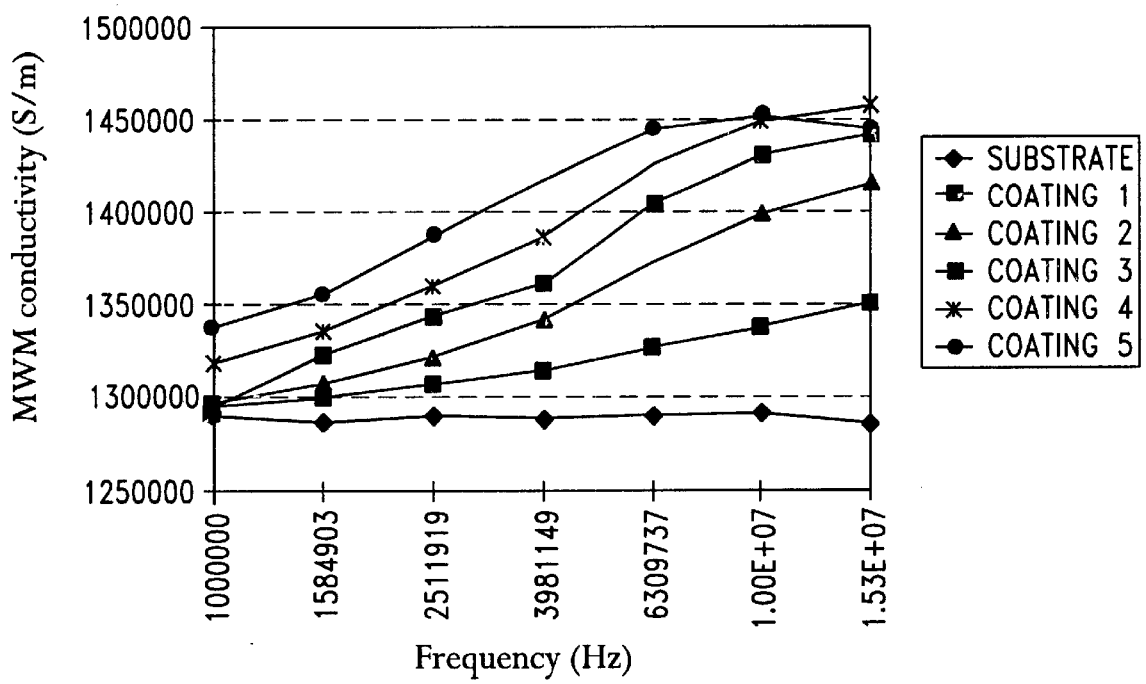
FIG. 8 is a graph of conductivity versus frequency for a plurality of coatings and a substrate.

FIG. 8 is a graph of multiple frequency conductivity profile. This is the first step to a multiple frequency coating thickness measurement that does not require knowledge of the coating conductivity. It can immediately be determined that the coating conductivity is greater than that of the substrate. For thin coatings the conductivity continues to rise as the frequency is raised. Thus, for this thin coating a lower bound on the coating conductivity is the conductivity at the highest frequency. For the thicker coatings the conductivity reaches a maximum and either remains flat or goes down a bit. For these thicker coatings the first guess for the coating conductivity is equal to this maximum conductivity.

When the frequency is increased to 15.8 MHZ, the MWM response for coatings thicker than 4 mils provides an accurate measure of the coating without being dependent on the coating thickness. This is because the skin depth at these high frequencies is smaller than 4 mils. Then, given the coating conductivity, a lower frequency measurement can be used to provide the thickness estimation.

In one preferred method, the four properties of 1) substrate conductivity; 2) coating conductivity; 3) coating thickness; and 4) lift-off are unknown. A plurality of frequencies, in a preferred embodiment, eleven frequencies, ranging from 100 kHz to 10 MHZ were used in the method. First, the higher frequencies are used to estimate the lift-off and coating conductivity and then the remaining frequencies are used to estimate the coating thickness and the substrate conductivity. The limitation of this approach currently appears to be that the high frequency data must not penetrate the coating significantly. Thus, this approach appears to be limited to specimens with a certain thickness of coating, such as 8 mils or thicker coating. Thus, for coatings thicker than, for example 8 mils, the method will permit independent measurement of coating thickness and conductivity, without knowledge of substrate properties or lift-off.

To extend the range, the substrate conductivity is assumed known. This permits the conductivity of the coating to be determined using a variation on the multiple frequency algorithm that uses as its performance index the stability of the lift-off and coating thickness estimates as a function of operating frequency.

Figure 9A:
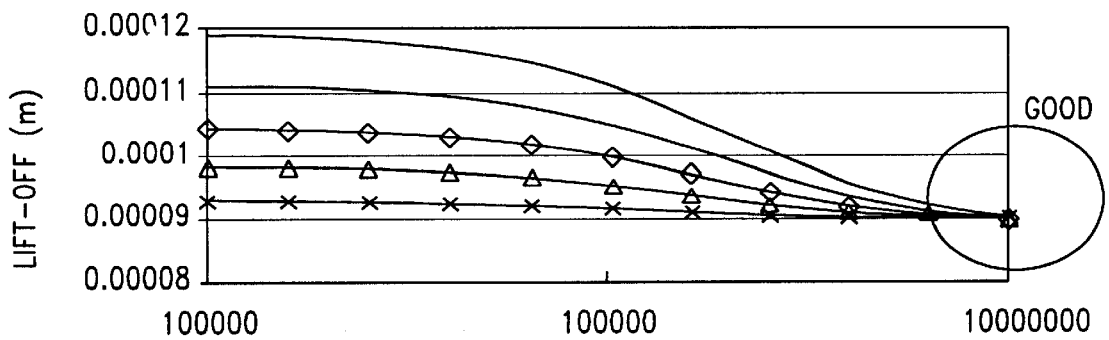
FIGS. 9A–9C are graphs of lift-off versus frequency for a variety of coating conductivities for various thickness of coatings.
Figure 9B:
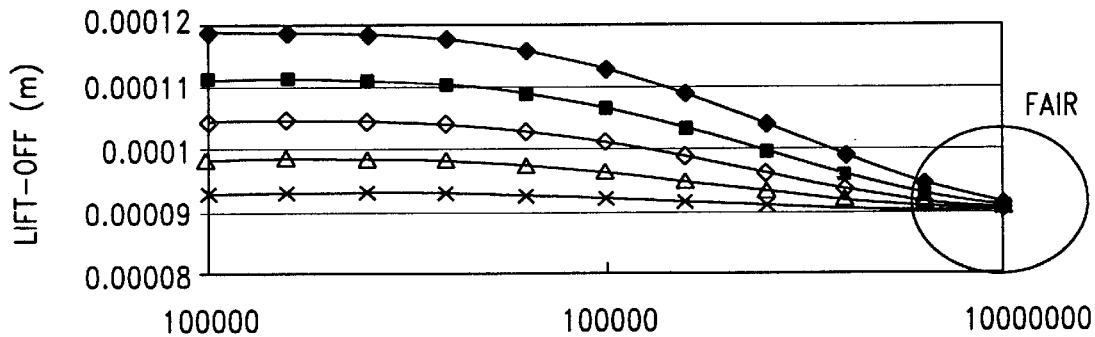
Figure 9C:
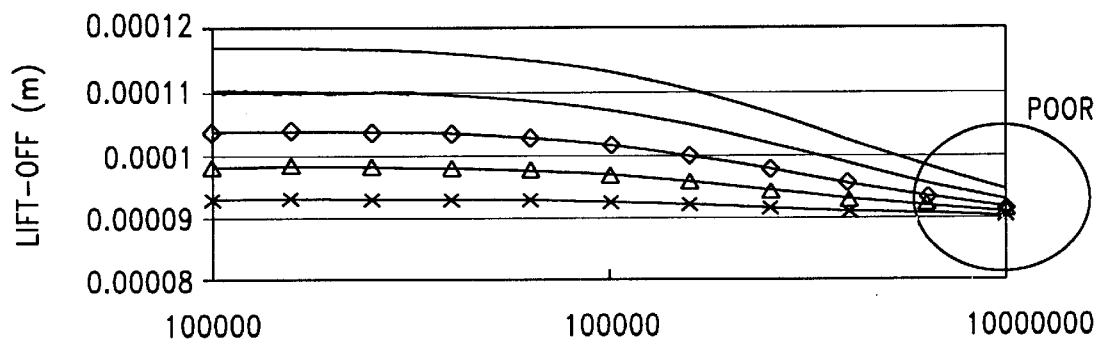

As shown in FIGS. 9A–9C, the algorithm, as represented by the flow chart in FIG. 4, provides a stable lift-off measure as a function of conductivity for coatings thicker than 8 mils. In other words, at the higher frequency the lift-off is independent of the conductivity of the coating. This means that the field penetration into the substrate is not significant.

Another variation on the multiple frequency method or algorithm assumes that the substrate conductivity is known and uses thickness/lift-off measurement grids instead of conductivity/lift-off measurement grids to build property profiles. This enables the operator to select the correct coating conductivity by monitoring the variation of both lift-off and coating thickness estimates with frequency. When the coating conductivity is set correctly the estimates of coating thickness and lift-off do not vary with frequency. This is more self-consistent than an approach for which the estimated lift-off is permitted to vary with frequency.

Rather than assuming all four relevant properties, (substrate conductivity, coating conductivity, coating thickness, and lift-off) are unknown, another method is based on the assumption that the substrate conductivity can be determined by direct measurement using an MWM, before the coating is applied, and that the coating process does not substantially change the substrate conductivity. This greatly simplifies the inversion analysis since the problem is reduced to determining three unknown properties instead of four.

In this method, once again a plurality of frequencies, ranging from 100 kHz to 10 MHz are used. In a preferred embodiment eleven frequencies are selected. The substrate conductivity is determined by MWM techniques using conductivity lift-off grids for measurements on an uncoated section of the sample. Next, MWM measurements are made on coated sections and the higher frequencies are used to estimate the lift-off and coating conductivity (the coating conductivity is corrected later for thinner coatings). In the third step, the lower frequencies are used to estimate the coating thickness. In the final step the coating conductivity is adjusted using a multiple frequency correction that ensures that the coating thickness measurement is the same for all frequencies.

Figure 10:
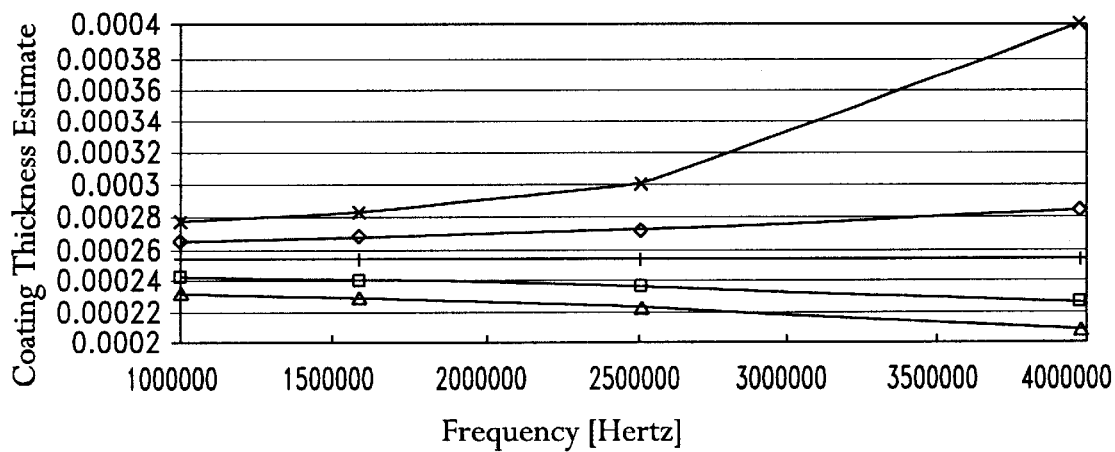
FIG. 10 is a graph of coating thickness estimates related to frequency.
Figure 11A:
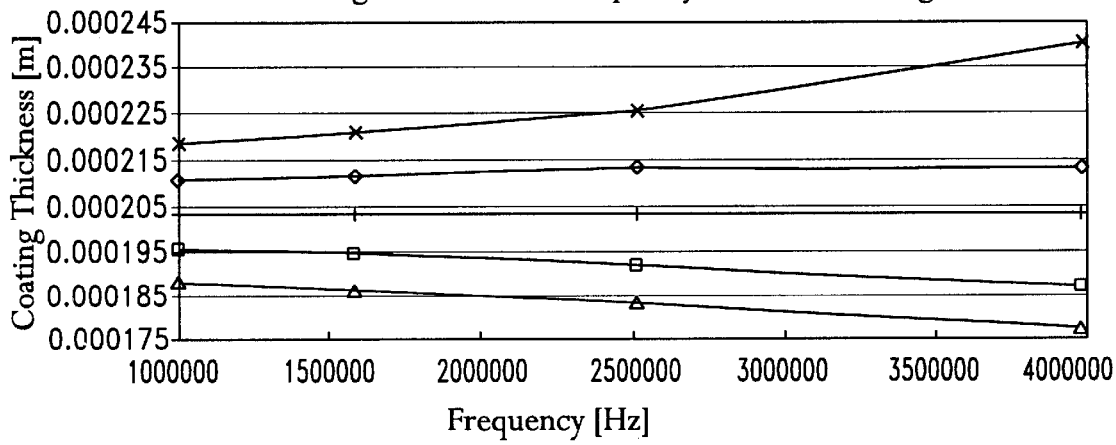
FIGS. 11A–11D show coating thicknesses versus frequency.
Figure 11B:
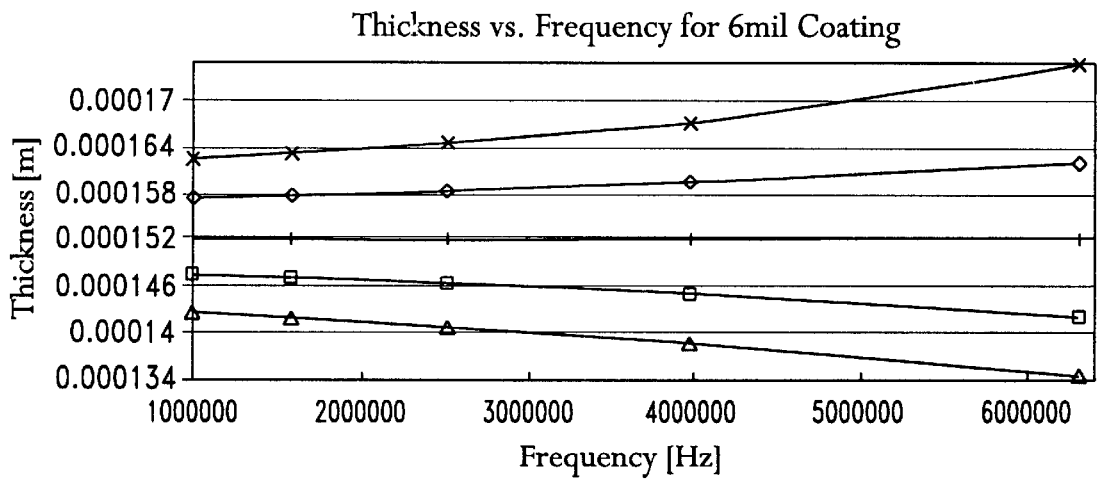
Figure 11C:
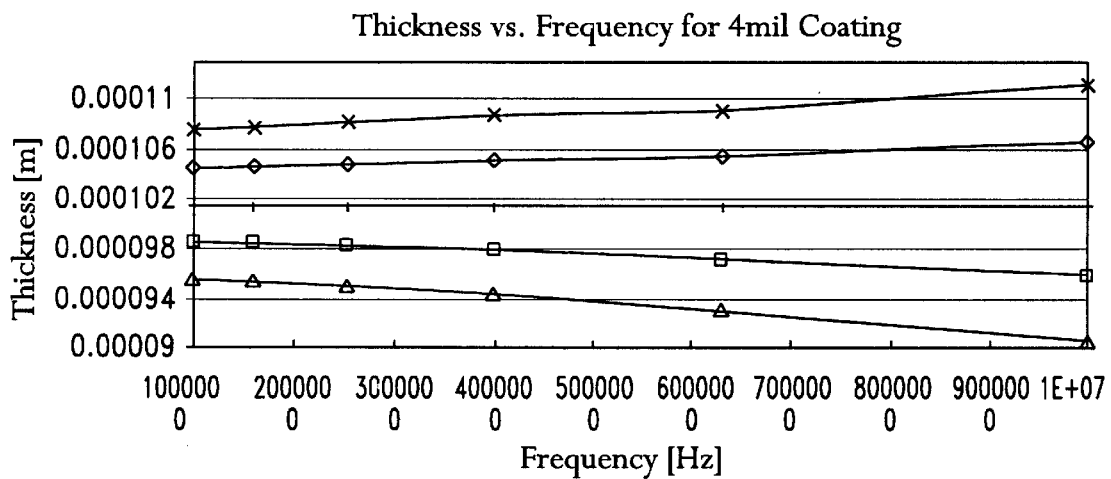
Figure 11D:
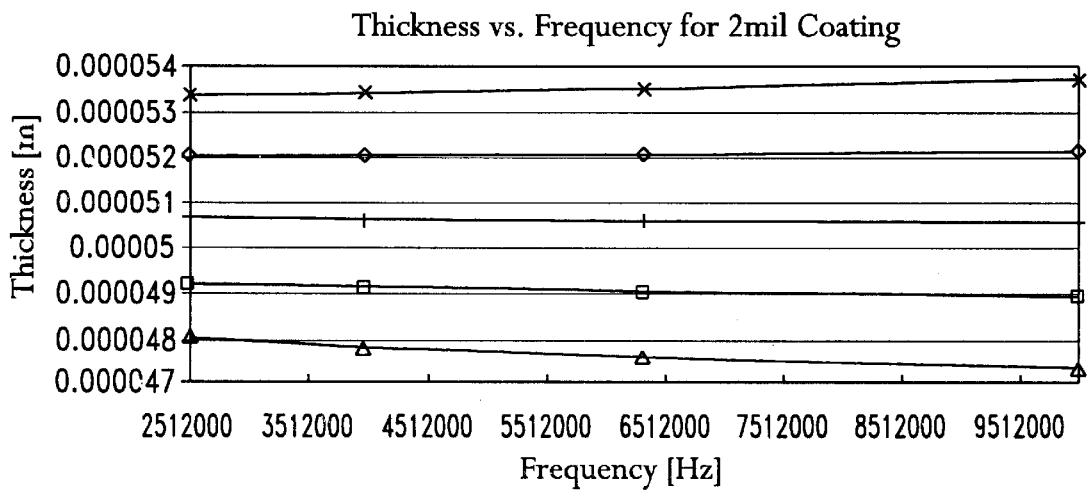

Using the known substrate conductivity and the estimates for coating conductivity and thickness, thickness lift-off grids are generated at each operating frequency. The MWM measurements on the coated sections are interpreted through this grid. If the estimate of coating conductivity is correct, the coating thickness estimates are independent of frequency over a broad range. If the coating conductivity estimate is high, the coating thickness estimates decrease with frequency and vice-versa. FIG. 10 shows this behavior for a ten-mil thick coating.

The slope of the thickness estimate versus frequency determines the degree and direction of the error in the coating conductivity estimate. Based on this, a new estimate of the coating conductivity is made and new thickness lift-off grids are generated. With the new grids, the variation in coating thickness estimate versus frequency will either be lower in magnitude or will have reversed sign. With these two sets of estimates the process can begin a Newton-Raphson (a.k.a., root finding, or binary search) iteration to correct coating conductivity and thickness values.

This process begins with two sets of estimates and linearly projects the correct coating conductivity value. That conductivity value is used as the basis for generating a new thickness lift-off grid. The new grid is used to develop a third set of estimates. Normally, the new estimates will have variations with frequency which are lower in magnitude than at least one of the prior two estimates. In this case, the set of estimates with the largest magnitude variation is replaced by the new set.

Occasionally, the new set of estimates may have larger magnitude variations than either of the two prior sets. In this case, there are two subcases. If the two prior sets have variations with frequency of opposite signs, then the linear projection is discarded and replaced with one based on the average of the two prior sets' coating conductivity estimates. If the two prior sets have variations with frequency of the same sign, then the new sets and the closest of the old two are used to provide the two coating conductivities to be averaged.

It can be rigorously mathematically proven that for any continuous function that any Newton-Raphson technique will converge, to a correct value. Since transimpedances of the MWM sensor are continuous functions of the coating and substrate properties, the necessary mathematical conditions are satisfied.

For a thickness range of interest between 1 mil and 12 mils, the method of measuring the conductivity of the substrate first was validated in numerical modeling for thicknesses of 2, 4, 6, 8 and 10 mils. The behavior improves with coating thickness over this range, and at 12 mils it should perform well. FIGS. 11A–11D show the results for the decreasing coating thicknesses, respectively 8, 6, 4, and 2 mils. Variation of coating thickness estimates with frequency will flatten out when the correct coating conductivity estimate is used.

Figure 12:
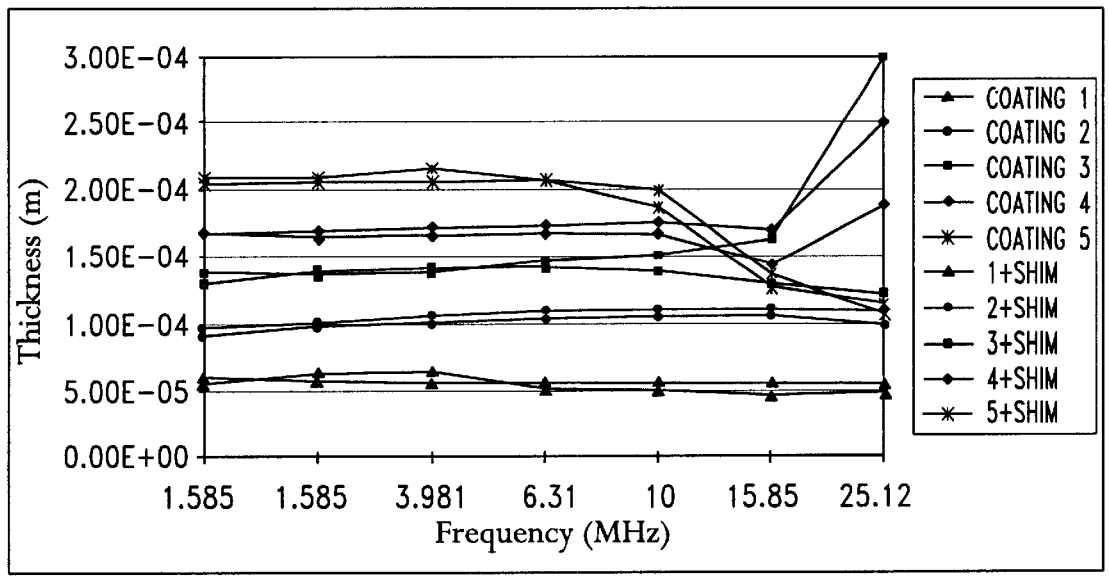
FIG. 12 is a graph of coating thickness estimates versus frequency when the estimated coating conductivity is too low.

The new calibration methods or algorithms described in U.S. patent application Ser. No. 09/182,693, with the multiple frequency application of sets of thickness/proximity measurement grids can provide an autonomous near-real time measurement capability. These sets of grids are generated for a range of coating conductivities that are determined and generated off-line for the general coating material type under test, and for a range of substrate conductivities for the general substrate material type being used. A supervisory algorithm has been developed that implements the method described with respect to FIG. 4 and which provides for a self-consistent estimation of coating thickness, coating conductivity, and proximity at each measurement frequency. Rules can be developed for different coating families to determine the correct property estimates by observing the self consistency of the results. For example, the thickness versus frequency should not vary when the correct coating conductivity has been selected. It turns out that a low estimate on the coating conductivity provides the inconsistent response shown below in FIG. 12.

Figure 13:
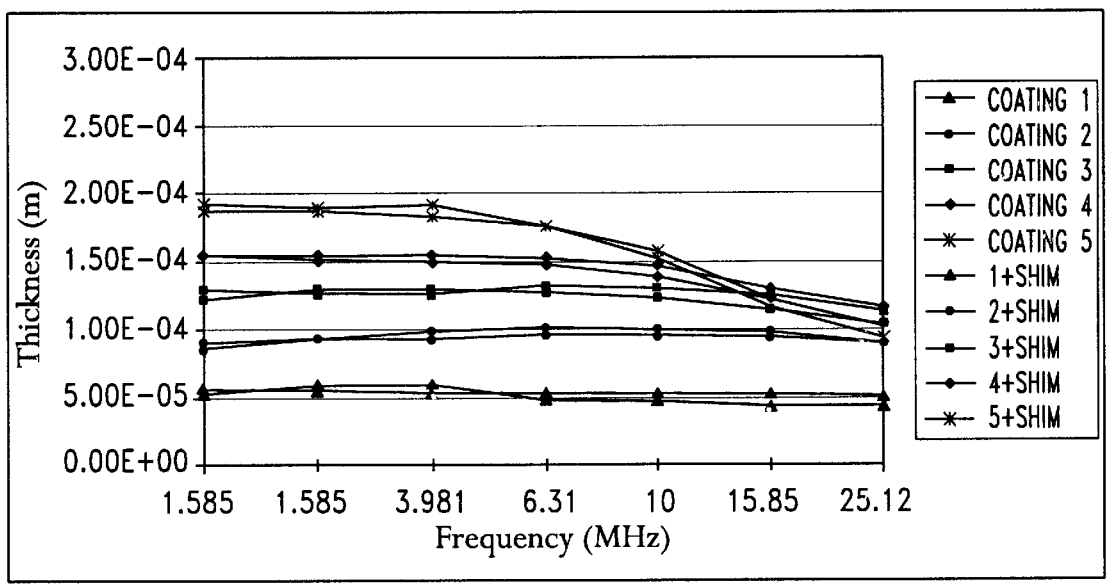
FIG. 13 is a similar graph where the correct coating conductivity is selected.

By running the experimental data through several sets of multiple frequency thickness/proximity grids, the correct conductivity can be determined. FIG. 13 shows the result when the correct conductivity is found. The thickness does not go up as a function of frequency. For the thicker coatings at higher frequencies the estimated thicknesses will go down because the magnetic fields do not reach the substrate.

Using the described method with multiple frequency data conductivity and thickness of coatings can be determined during manufacturing, without requiring a training set of coating standards with known thicknesses.

The above methods can be used with any combination of magnetizable or nonmagnetizable coating on a magnetizable or nonmagnetizable substrate.

In an experiment to demonstrate repeatable porosity and thickness measurements on both magnetizable and nonmagnetizable metallic coatings, using an MWM, the new multiple frequency method of the claimed invention was used on Alclad coated aircraft skin.

Figure 14A:
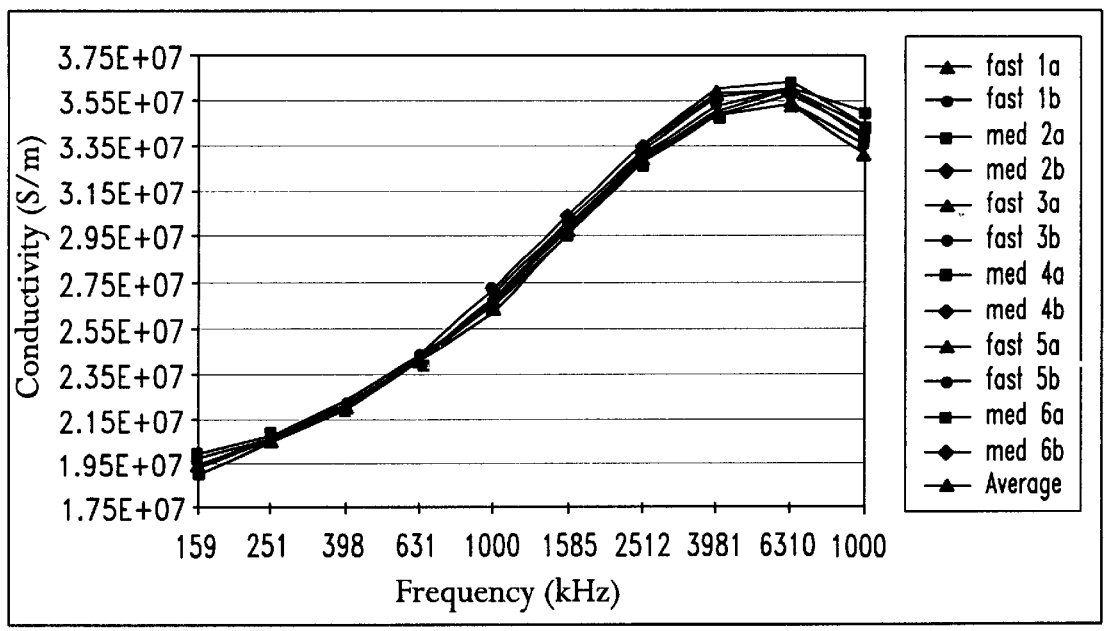
FIG. 14A is conductivity versus frequency for actual multiple frequency data on alclad coated material using MWM conductivity/proximity grids.

An aluminum specimen with approximately uniform conductivity as a function of depth from the surface was used for calibration. The conductivities of the coating and substrate are determined from the plot in FIG. 14A of the MWM conductivity estimates as a function of frequency, using the uniform media approximation for the measurement grids at each frequency.

Figure 14B:
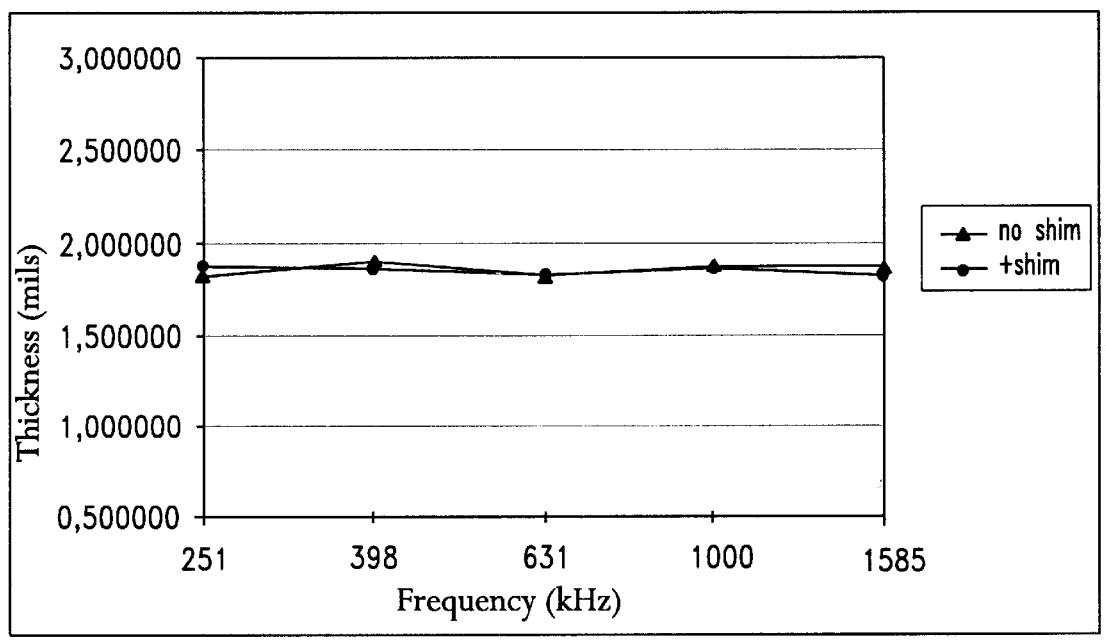
FIG. 14B is thickness versus frequency for multiple frequency on alclad coated material.

The peak conductivity is used to determine the coating thickness and the asymptotic behavior at the lower frequencies is used to estimate the substrate conductivity. Then thickness-proximity measurement grids are generated at each frequency in a selected range based on the data in FIG. 14A. FIG. 14B shows the results of measurements made at different frequencies using the generated proximity thickness grids with and without an insulating shim. The purpose of the shim is to show that the thickness measurements are not effected by sensor lift-off (proximity) variations.

Figure 15:
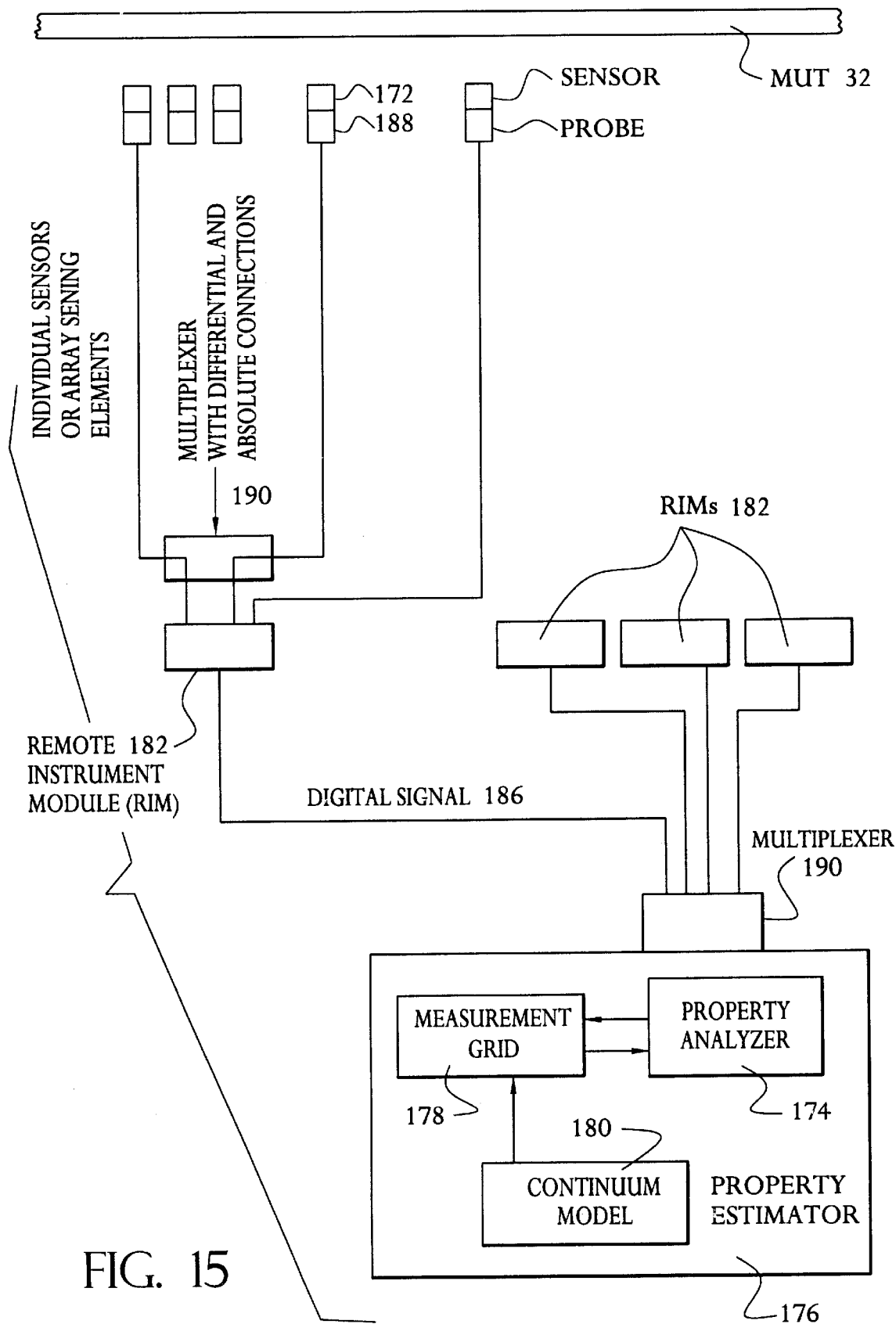
FIG. 15 is a schematic of an alternative embodiment of the instrument and a material under test. The instrument includes a multiplexer near the sensors that provide both differential and absolute connections of the sensing elements for an array.

FIG. 15 illustrates an alternative embodiment of the instrumentation 170. Similar to FIG. 1, the sensor 172 is placed in proximity to the material under test 32 and receives an input current or voltage source. The sensing elements as described above in FIGS. 3 through 8 are measured to determine the voltage induced in the respective sensors. This magnitude and phase is sent into a property analyzer 174 and upon comparison an estimate of the material test properties are determined. In FIG. 15, the instrument 170 has a property estimator 176, in a preferred embodiment, a microprocessor, which contains in software and data the property analyzer 174, measurement grids 178, and a continuum model 180 that generates the measurement grids off-line and stores them in a measurement grid library for use on-line. The property estimator 176 is connected to a remote instrument module 182 (RIM) which contains the analog portion of the impedance analyzer 184. The signal from the RIM 182 to the property estimator 176 is a digital signal 186 to minimize interference shielding issues and drop-in signal issues. From the RIM 182, the sensor 172 is connected through a probe 188. In a preferred embodiment the probe contains additional circuitry to provide both multiplexing of multiple sensing elements and additional signal amplification as in further detail in U.S. patent application Ser. No. 09/182,693 entitled, "Absolute Property Measurement With Air Calibration" filed on Oct. 29, 1998 by Neil J. Goldfine, et al.

In a preferred embodiment both the property estimator and the RIM can have multiplexers 190 so that each can have multiple items which are fed from them i.e. the property estimator 176 may have multiple RIM 182 and each RIM 182 may have multiple sensors. The wiring and shielding near the sensor head are fixed rigidly to limit changes after initial calibration.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for determining properties of a coating and substrate of a material under test comprising the steps of:

placing a sensor in proximity to the material under test;

introducing a drive signal into the sensor at multiple frequencies;

measuring the sensor output at the multiple frequencies;

converting the sensor output to measured physical parameters of the material under test at each of the multiple frequencies, the measured physical parameters being conductivity ($\sigma$) and lift-off (h);

estimating the substrate and the coating conductivities (σ) from a limit of conductivity at a low frequency and a limit of conductivity at a high frequency;

generating thickness-liftoff grids from the estimated conductivities;

computing lift-off or thickness of the coating from the thickness-liftoff grids; and plotting liftoff or thickness as a function of frequency;

adjusting the estimate of the substrate and the coating conductivities if indicated by the liftoff or thickness plot.

2. The method of determining properties of a coating and substrate of claim 1 wherein the step of adjusting obtains a coating thickness estimate which is substantially constant with frequency.

3. The method of determining properties of a coating and substrate of claim 1 wherein a measurement grid is used to convert the sensor output to the measured physical parameters.

4. A method of claim 1 where the conductivity and lift-off are first estimated using measurement grids that assume that the conductivity is constant as a function of depth from the surface.

5. A method for determining properties of a coating and substrate of a material under test comprising the steps of:

placing a sensor in proximity to the material under test;

introducing a current into the sensor at a multiple frequencies;

measuring the voltage resulting on the sensor using an impedance analyzer at the multiple frequencies;

converting the phase and magnitude of the impedance to conductivity (σ);

adjusting at least one value of a control parameter to force the conductivity (σ) estimate to be independent of frequency.

6. The method of determining properties of a coating and substrate of claim 5 wherein the adjusting at least one value of the control parameter comprises the steps of:

estimating coating thickness and lift-off from the estimate of the conductivities of the coating and the substrate; and adjusting at least one of coating thickness and lift-off therein forcing the conductivity (σ) estimate to be independent of frequency.

7. The method of determining properties of a coating and substrate of claim 5 wherein a measurement grid is used to convert the phase and magnitude of the impedance to conductivity (σ); and the determining of the estimate of the conductivities (σ) uses a low frequency limit and a high frequency limit of the measured conductivities (σ).

8. The method of claim 5 wherein the sensor is an eddy current sensor.

9. The method of claim 8 wherein the sensor is an MWM.

10. The method of claim 8 wherein the sensor has a plurality of sensing elements which are windings.

11. The method of claim 5 wherein a supervisory algorithm is used to recognize one or more graphical frequency patterns.

12. The method of claim 11 wherein the graphical frequency patterns are used to estimate a near region conductivity and an interior region conductivity.

13. The method of claim 11 where the graphical frequency patterns are used to establish one or more adjusted parameter values associated with frequency independent unknown properties that are constant over a range of frequencies.

14. A method for determining at least two unknown frequency independent properties of interest of a material under test comprising the steps of:

placing a sensor in proximity to the material under test;

introducing a drive signal into the sensor at multiple frequencies;

measuring the sensor output at the multiple frequencies;

converting the sensor output to one of the unknown properties at each measurement frequency for the material under test and adjusting at least one of the other unknown properties until the one of the unknown properties is constant with frequency.

15. The method of claim 14 wherein the one unknown property is coating thickness and the at least one of the other unknown properties is coating and substrate conductivities.

16. The method of claim 15 wherein one of the at least one of the other properties is lift-off at a high frequency.

17. The method of claim 14 wherein a conductivity/lift-off measurement grid is used for converting the sensor output and one of the at least one of the other properties is lift-off at a high frequency.

18. A method for determining properties of a coating and substrate comprising the steps of:

providing a sensor having a primary winding meandering in a square wave pattern with a plurality of parallel legs and a plurality of sensing elements with the sensing elements interposed between the legs of the primary winding;

connecting the sensor to an impedance analyzer;

placing the sensor in proximity to the material under test;

introducing a current into the primary winding at a multiple of frequencies;

measuring the voltage resulting on the sensing elements using the impedance analyzer at a multiple of frequencies;

converting the phase and magnitude of the impedance to conductivity (σ) using a measurement grid; and determining from a low limit of conductivity (σ) and a high limit of conductivity (σ) versus frequency an estimate of conductivities (σ) of the coating and the substrate.

19. The method of determining properties of a coating and a substrate of claim 18, further comprising:

generating thickness lift-off grids from the estimate of conductivities.

20. The method of claim 19 further comprises the steps:

computing lift-off and thickness of the coating; and plotting the thickness as a function of frequency.

21. The method for determining properties of a coating and substrate of claim 20 further comprising the steps of calibrating the sensor.

22. The method for determining properties of a coating and substrate of claim 21 wherein the calibration of the sensor comprises the following steps:

prior to moving the sensor in proximity to a material under test;

placing the sensor in the air away from a material under test;

introducing a current into the primary winding;

measuring the voltage resulting on the sensing elements using the impedance analyzer; and aligning the phase and magnitude of the impedance to the measurement grid.

23. The method for determining properties of a coating and substrate of claim 21 wherein the calibration of the sensor comprises the following steps:

prior to moving the sensor in proximity to a material under test;

placing the sensor on a known modeled substrate;

introducing a current into the primary winding;

measuring the voltage resulting on the sensing elements using the impedance analyzer; and aligning the phase and magnitude of the impedance to the measurement grid.

24. The method of claim 23 wherein the known modeled substrate is a coated substrate.

25. The method of claim 23 wherein the known modeled substrate is an uncoated substrate.

26. A method of measuring a unknown frequency independent property and at least one other property of a material under test comprising the steps of:

producing a time-varying magnetic field by a drive winding;

sensing a change in the field at a sensing element at multiple frequencies;

converting measured data to an effective conductivity ($\sigma$) of the material in a region penetrated by the magnetic fields using a look-up table;

estimating a near surface region conductivity and proximity at a high frequency using a conductivity/proximity lookup table;

estimating an interior region conductivity at low frequencies;

selecting a look-up table for a near surface region thickness and a second property;

converting measured data at each frequency to near surface region thickness and the second parameter using the lookup table; and adjusting estimated near surface and interior conductivities until the near surface thickness estimate is constant over several frequencies of the measure data.

27. The method of claim 26 wherein the at least one other property is frequency independent.

28. The method of claim 27 wherein the surface region is a coating.

29. The method of claim 27 wherein the surface region is a process-affected zone.

30. The method of claim 27 wherein the lookup tables are measurement girds generated with a model.

31. The method of claim 27 wherein the lookup table are measurement grids generated with a training set of well characterized samples.

32. The method of claim 27 wherein the conductivity of the coating is converted to porosity using comparisons with a training set of references standards.

33. The method of claim 27 wherein the near surface region is a shot peened region.

34. The method of claim 27 wherein one of the at least one other property is a magnetic permeability for the near surface region.

35. The method of claim 27 wherein one of the at least one other property is a magnetic permeability for the interior region.

36. The method of claim 26 wherein one of the at least one other property is frequency dependent.

37. The method of claim 36 wherein the frequency dependence is empirically determined.

38. The method of claim 36 wherein the frequency dependence is determined with a model.

39. The method of claim 36 wherein the frequency dependence represents a flaw in the material under test.

40. The method of claim 39 wherein the flaw is a crack and other property is conductivity.

41. The method of claim 39 wherein the flaw is a crack and other property is conductivity.

42. The method of claim 39 wherein the flaw is a crack and other properties are a frequency dependent diamagnetic complex permeability and a non-frequency dependent ohmic conductivity for the coating.

43. The method of claim 39 wherein the flaw is a crack and other properties are a frequency dependent diamagnetic complex permeability and a non-frequency dependent ohmic conductivity for the substrate.

* * * * *